United States Patent
Zhou et al.

(10) Patent No.: US 12,036,531 B2
(45) Date of Patent: Jul. 16, 2024

(54) LOW-COST AND LOW-PLATINUM COMPOSITE CATALYST FOR LOW-TEMPERATURE PROTON EXCHANGE MEMBRANE FUEL CELLS

(71) Applicant: NANYANG TECHNOLOGICAL UNIVERSITY, Singapore (SG)

(72) Inventors: Weijiang Zhou, Singapore (SG); Siew Hwa Chan, Singapore (SG); Ovi Lian Ding, Singapore (SG); Jinli Yu, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 432 days.

(21) Appl. No.: 17/430,377

(22) PCT Filed: Feb. 14, 2020

(86) PCT No.: PCT/SG2020/050076
§ 371 (c)(1),
(2) Date: Aug. 12, 2021

(87) PCT Pub. No.: WO2020/167257
PCT Pub. Date: Aug. 20, 2020

(65) Prior Publication Data
US 2022/0126275 A1    Apr. 28, 2022

(30) Foreign Application Priority Data
Feb. 15, 2019    (SG) .......................... 10201901322Y

(51) Int. Cl.
*B01J 23/42*    (2006.01)
*B01J 21/18*    (2006.01)
(Continued)

(52) U.S. Cl.
CPC ............... *B01J 23/42* (2013.01); *B01J 21/18* (2013.01); *B01J 35/50* (2024.01); *B01J 37/04* (2013.01); *B01J 37/06* (2013.01); *B01J 37/08* (2013.01)

(58) Field of Classification Search
CPC . B01J 23/42; B01J 21/18; B01J 35/026; B01J 37/04; B01J 37/06; B01J 37/08
(Continued)

(56) References Cited

U.S. PATENT DOCUMENTS

| 8,709,295 B2 | 4/2014 | Zelenay et al. |
| 11,631,865 B2 * | 4/2023 | Hwang ............... H01M 4/8882 502/100 |

(Continued)

FOREIGN PATENT DOCUMENTS

| CN | 108808022 A | * | 11/2018 | .......... H01M 4/8825 |
| CN | 109346728 A | * | 2/2019 | .............. H01M 4/86 |

(Continued)

OTHER PUBLICATIONS

Nature, *A News Fuel Cell Cathode Catalyst*, vol. 201, Mar. 21, 1964, 1212-1213.

(Continued)

*Primary Examiner* — Patricia L. Hailey
(74) *Attorney, Agent, or Firm* — Alston & Bird LLP

(57) ABSTRACT

A composite catalyst is provided. The composite catalyst includes a first catalytic material incorporated with a second catalytic material, wherein the first catalytic material comprises carbon doped with (i) nitrogen and (ii) at least one non-precious transition metal, and wherein the second catalytic material comprises a carbon-based supporting material incorporated with platinum nanoparticles. A method of producing the composite catalyst is also provided. The method includes providing a mixture comprising the first (Continued)

catalytic material and the second catalytic material, and subjecting the mixture to a size reduction step. The first catalytic material and a method of producing the first catalytic material are disclosed herein.

20 Claims, 9 Drawing Sheets

(51) Int. Cl.
    *B01J 35/50*         (2024.01)
    *B01J 37/04*         (2006.01)
    *B01J 37/06*         (2006.01)
    *B01J 37/08*         (2006.01)

(58) Field of Classification Search
    USPC .................................. 502/182, 185, 339
    See application file for complete search history.

(56) References Cited

U.S. PATENT DOCUMENTS

| | | | | |
|---|---|---|---|---|
| 11,715,834 | B2* | 8/2023 | Zhou | .............. H01M 8/08 |
| | | | | 502/101 |
| 2011/0287174 | A1* | 11/2011 | Calabrese Barton | ........................ |
| | | | | H01M 8/1004 |
| | | | | 502/174 |
| 2023/0369609 | A1* | 11/2023 | Rong | .............. H01M 4/926 |

FOREIGN PATENT DOCUMENTS

| | | | | |
|---|---|---|---|---|
| CN | 110465652 | A | * 11/2019 | ............... B22F 1/00 |
| CN | 108258253 | B | * 12/2020 | ............ H01M 12/06 |
| CN | 114210358 | A | * 3/2022 | .......... B01J 35/0093 |
| KR | 20180029414 | A | 3/2018 | |

OTHER PUBLICATIONS

Bezerra et al., "*A review of FE-N/C and Co-N/C catalysts for the oxygen reduction reaction*," Electrochimica Acta 53 (2008) 4937-4951.

Bezerra et al., "*A review of heat-treatment effects on activity and stability of PEM fuel cell catalysts for oxygen reduction reaction*," Journal of Power Source, 173, (2007) 891-908.

Liu et al., "*Influence of nitrogen and iron precursors on the synthesis of FeNx/carbons electrocatalysts toward oxygen reduction reaction in acid solution*" Electrochimica Acta, 135 (2014) 147-153.

Ma et al., *Nitrogen-Doped Hollow Carbon Nanoparticles with Excellent Oxygen Reduction Performances and Their Electrocatalytic Kiknetics*, The Journal of Physical Chemistry 2011, 115 (50), 25148-25154.

Liang et al., *Covalent Hybrid of Spinel Manganese—Cobalt Oxide and Graphene as Advanced Oxygen Reduction Electrocatalysts*, Journal of the American Chemical Society, 2012, 134(7), 3517-3523.

Qiao et al., *Cobalt and Nitrogen Codoped Graphene with Inserted Carbon Nanospheres as an Efficient Bifunctional Electrocatalysts for Oxygen Reduction and Evolution*, ACS Sustainable Chem. Eng., 2016, 4 (8), 4131-4136.

Deng et al., *A highly efficient electrocatalyst for oxygen reduction: phosphorus and nitrogen co-doped hierarchically ordered porous carbon derived from an iron-functionalizedc polymer*, Nanoscale 2016, 8(3), 1580-1587.

Chen et al. "*Nitrogen-doped graphene-supported transition-metals carbide electrocatalysts for oxygen reduction reaction*." Scientific reports 5.1 (2015): 1-10.

Dhanasekaran et al., "*A nitrogen and cobalt co-doped titanium dioxide framework as a stable catalyst support for polymer electrolyte fuel cells*" RSC advances 6.91 (2016): 88736-88750.

Kruusenberg, Ivar et al. "*Cobalt-Nitrogen Co-doped Carbon Nanotube Cathode Catalyst for Alkaline Membrane Fuel Cells*" ChemElectroChem 3.9 (2016): 1455-1465.

Higgins et al. "*Combined Nitrogen Precursor Approach to Develop Cobalt-Based Non-Precious Catalysts for Polymer Electrolyte Fuel Cell Cathodes*" ECS Meeting Abstracts. No. 26. IOP Publishing, 2015.

Park et al., *Enhanced oxygen reduction reaction of Pt deposited Fe/N-doped bimodal porous carbon nanostructure catalysts*. Journal of Catalysis, Feb. 3, 2018, vol. 359, pp. 46-54.

Kim, J. et al., "*A New Strategy for Outstanding Performance and Durability in Acidic Fuel Cells: A Small Amount Pt Anchored on Fe, N co-Doped Graphene Nanoplatelets*" ChemElectroChem, Jul. 16, 2018, vol. 5, No. 19, pp. 2857-2862.

International Search Report and Written Opinion for PCT/SG2020/050076 (ISA/SG) mailed Apr. 8, 2020 (13 pages).

\* cited by examiner

LOW-COST AND LOW-PLATINUM COMPOSITE CATALYST FOR LOW-TEMPERATURE PROTON EXCHANGE MEMBRANE FUEL CELLS

CROSS-REFERENCE TO RELATED APPLICATIONS

This application is a national phase entry of PCT/SG2020/050076, filed on 14 Feb. 2020, which claims the benefit of priority of Singapore Patent Application No. 10201901322Y, filed 15 Feb. 2019, the contents of which being hereby incorporated by reference in their entirety for all purposes.

TECHNICAL FIELD

The present disclosure relates to a composite catalyst usable in a fuel cell. The present disclosure also relates to a method of producing such composite catalyst. The composite catalyst may include two catalytic materials.

BACKGROUND

A fuel cell is deemed an energy conversion device that transforms the chemical energy of fuel efficiently into electrical energy. A low-temperature fuel cell, such as proton exchange membrane fuel cell (PEMFC) and direct alcohol fuel cell (DAFC), may have high power density that renders them promising alternatives for powering electric vehicles, field stations, and portable powers. Deemed as environmentally-benign energy converters, the fuel cell may be distinguished by a particularly high energy conversion efficiency, low noise, and low or zero pollution. The feedstocks for a fuel cell may include hydrogen, hydrogen-rich gas, alcohols and/or formic acid, as fuels. Oxygen, air, chlorine and/or hydrogen peroxide solution may constitute the oxidizers in the fuel cell.

A fuel cell catalyst, in particular, the catalyst used at the cathode, is one of the key components in the proton exchange membrane fuel cell. Such catalyst may be termed a cathode catalyst. The activity of the cathode catalyst may directly affect the fuel cell's long-term performance, cost and applications. At the cathode, the cathode oxygen reduction reaction (ORR) tends to be the performance-determining reaction, as oxygen reduction kinetics tends to be sluggish compared to hydrogen oxidation at the anode. Despite this, platinum (Pt) has been used as the catalyst at the anode and cathode. Platinum, though expensive, may provide good catalytic performance at low temperatures and may thus be heavily used in PEMFCs. Performance of such platinum catalysts, however, may not be desirably high and this tends to render excessive use of noble metals, thereby significantly increasing overall cost of PEMFCs and DAFCs. The high cost of PEMFCs and DAFCs deters their widespread adoption, especially for use in automotive applications.

A projected target of fuel cell catalyst cost was set at $5/kW but the current price appears to be above $25/kW considering platinum as the electrocatalyst. Low-cost efficient catalysts for oxygen reduction intended to fully or partially replace the platinum loading in the current catalysts were then investigated. For example, non-noble metallic catalysts like macrocyclic transition metal compounds have been reportedly used as catalytic oxygen reduction electrocatalyst under alkaline conditions. Further, non-platinum binary and ternary alloys, transition metal chalcogenides, macrocycles containing $MN_4$ moiety, and various transition metal carbides and nitrides have been developed to address the cathode catalysis limitations. Among these, porphyrin-based macrocycles bound to transition metals, especially Co and Fe, have been studied for use as potential non-platinum catalyst and may be considered a promising alternative to Pt-based catalysts. Examples of macrocycle catalyst may include iron phthalocyanine and cobalt methoxytetraphenylporphyrin. Unfortunately, the catalytic activity and stability of such macrocycles, even after heat-treating at high temperatures, tend to be less favourable compared to Pt-based catalysts.

In the recent years, transition metal and composite metal oxides supported on nitrogen-doped carbon materials for oxygen reduction reaction have attracted attention. These two types of catalysts may be cheaper and may have activity and selectivity for oxygen reduction reaction. Different synthesis procedures reported include a heat-treatment step, wherein precursors of nitrogen, carbon, and transition-metals may be combined at an elevated temperature to produce active sites for oxygen reduction. For example, nitrogen-doped carbon hollow nanospheres synthesized by vapour deposition demonstrated comparable ORR activity. A $MnCo_2O_4$/N-doped graphene hybrid material was synthesized by combining nanoparticle nucleation and growth on graphene oxide sheets and cation substitution of spinel metal oxide nanoparticles, which demonstrated highly efficient electrocatalytic activity towards ORR in alkaline conditions. The nucleation and growth method results in covalent coupling between spinel oxide nanoparticles and N-doped reduced graphene oxide sheets, providing activity and durability higher than that of a physical mixture of nanoparticles and N-doped reduced graphene oxide (N-rmGO) sheets.

In another example, a method for making a supported Fe—Co hybrid catalyst for oxygen reaction reduction prepared by a two-step process has been reported. The cobalt-containing catalyst support was first synthesized by combining the cobalt-containing complex with a carbon material, and heating under certain conditions. The final product was produced by polymerizing an aniline on the cobalt-containing graphene support in the presence of an iron-containing compound. The supported Fe—Co hybrid catalyst contain cobalt and iron-bound polyaniline species, and demonstrated activity and stability in acidic environment.

In another example, a cobalt and nitrogen co-doped three-dimensional (3D) graphene catalyst has been reported. The catalyst was synthesized by inserting carbon nanospheres into interlayers of graphene sheets. The catalyst exhibited stability and activity for ORR.

In another example, a phosphorus and nitrogen co-doped hierarchically ordered porous carbon, derived from an iron-functionalized polymer, having a high efficiency as electrocatalyst for oxygen reduction reaction was reported. The material was made through an evaporation-induced self-assembly process that simultaneously combined the carbonization and nitrogen doping processes. The catalyst possessed a large surface area and a pore volume. Notably, the catalyst exhibited ORR catalytic activity, stability and methanol tolerance in acidic electrolytes, thus making the catalyst promising for fuel cells.

The alternative catalysts mentioned above may circumvent the use of platinum but there are applications that may still require platinum-based catalysts. Such applications, for example, may require low temperature operation. The use of platinum-based catalysts then becomes inevitable as they are able to efficiently exert desirable catalytic activity and stability at low temperatures perhaps better than the alternatives mentioned above. In such instances, the alternatives mentioned above do not even improve the economic viability of using platinum-based catalysts. In fact, the alternatives mentioned above may have their own drawbacks and/or involve production methods that may be more inconvenient.

There is thus a need to provide for a solution that ameliorates one or more limitations mentioned above. The solution should at least provide for a composite catalyst containing platinum and method of producing such composite catalyst.

SUMMARY

In a first aspect, there is provided for a composite catalyst comprising:

a first catalytic material incorporated with a second catalytic material, wherein the first catalytic material comprises carbon doped with (i) nitrogen and (ii) at least one non-precious transition metal, and wherein the second catalytic material comprises carbon-based supporting materials incorporated with platinum nanoparticles.

In another aspect, there is provided for a method of producing a composite catalyst comprising a first catalytic material incorporated with a second catalytic material, wherein the first catalytic material comprises carbon doped with (i) nitrogen and (ii) at least one non-precious transition metal, and wherein the second catalytic material comprises a carbon-based supporting material incorporated with platinum nanoparticles, the method comprising:

providing a mixture comprising the first catalytic material and the second catalytic material; and subjecting the mixture to a size reduction step.

In another aspect, there is provided for a non-precious transition metal catalyst comprising carbon doped with (i) nitrogen and (ii) at least one non-precious transition metal.

In another aspect, there is provided for a method of producing a non-precious transition metal catalyst, the method comprising:

dispersing a structure-directing agent in an aqueous medium, wherein the aqueous medium comprises (i) at least one metal salt and/or at least one metal oxide and (ii) at least an organic compound comprising an amine;

mixing the aqueous medium and an alcoholic solution comprising at least one non-precious transition metal precursor to form a liquid ink;

drying the liquid ink to form a viscous solid; and pyrolyzing the viscous solid in an inert atmosphere to form the non-precious transition metal catalyst.

In another aspect, there is provided for a method of producing a non-precious transition metal catalyst, the method comprising:

mixing a solid mixture comprising at least one non-precious transition metal precursor and an organic compound comprising an imidazole; and pyrolyzing the solid mixture in an alkaline atmosphere to form the non-precious transition metal catalyst.

BRIEF DESCRIPTION OF THE DRAWINGS

The drawings are not necessarily to scale, emphasis instead generally being placed upon illustrating the principles of the invention. In the following description, various embodiments of the present disclosure are described with reference to the following drawings, in which.

DETAILED DESCRIPTION

Figure 1:
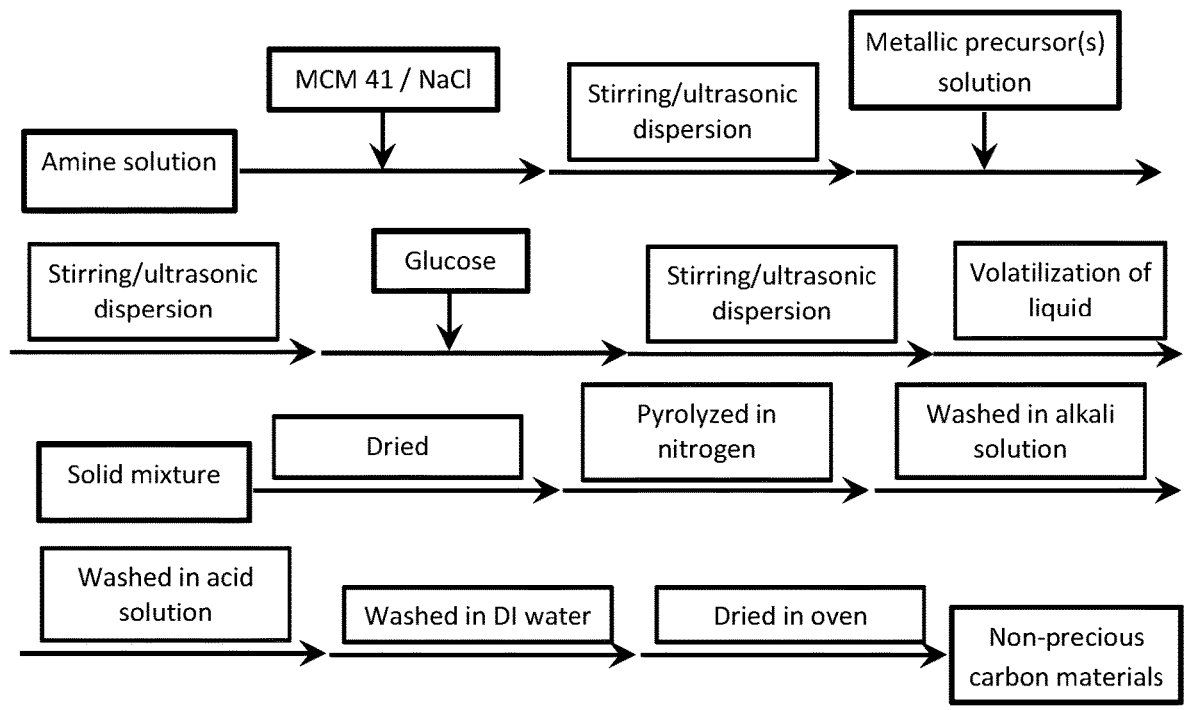
FIG. 1 concisely illustrates the synthesis procedure of non-precious transition metal carbon catalysts containing the non-precious transition metals and nitrogen.
Figure 2:
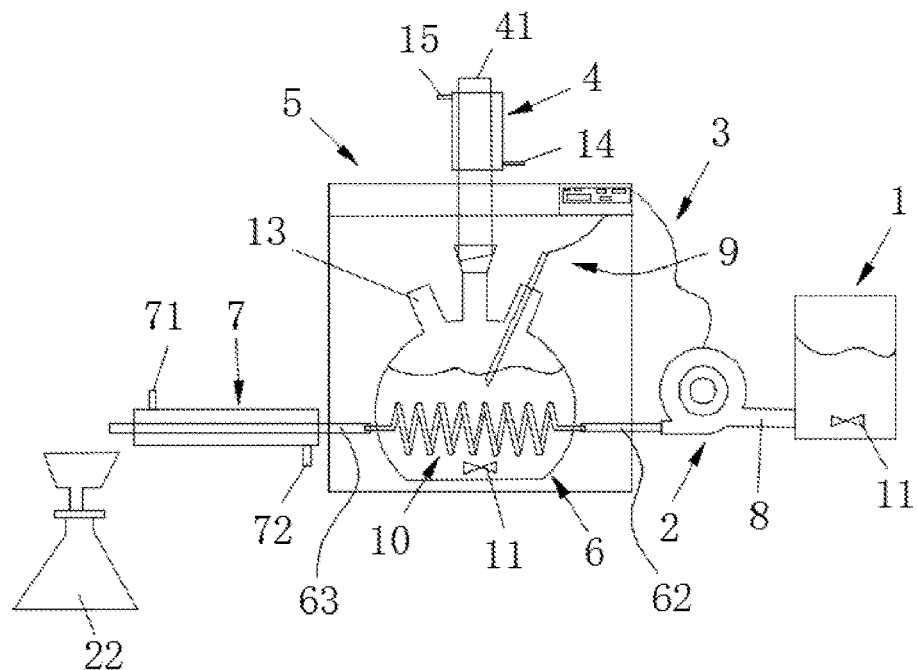
FIG. 2 is a schematic diagram depicting the setup for synthesis of nanosized platinum catalyst supported on carbon. Such a platinum catalyst may be termed herein "carbon-supported platinum catalyst". The setup in FIG. 2 is operable for continuous production of the carbon-supported platinum catalyst. The container 1 with electromagnetic stirrer 11 (or other agitation auxiliaries suitable for stirring therein) is used to store the raw materials which include the platinum precursor, carbon support, citrate or citric acid, and solvent. All the materials may be dispersed uniformly therein and prepared according to various embodiments described herein before transfer into the spiral reactor 10 by the pump 2 through tube 8. The spiral reactor 10 may be immersed in and across the heating oil stored in a flat-bottom three-neck flask 6. The heating oil, which may be stirred by electromagnetic stirrer 11 (or other suitable agitation auxiliaries), may be used to maintain a stable temperature. One of the side necks of flask 6 may be connected with the temperature sensor 9 which may be connected to the controller of microwave oven 5 to measure and control temperature of the heating oil. Another side neck 13 may be connected to a discharge line (not shown) to avoid the heating oil overflow from potential overheating. A condenser 4 may be connected to the main neck of flask 6 to reflux the heating oil during operation. The control unit of microwave oven 5 may also be connected by wire 3 to control pump 2. The starting up and shutting down of pump 2 may be controlled by the control unit of microwave oven 5, which may influence the actual temperature of the heating oil in flask 6. Tubes 62 and 63 may be used to direct the flow into and from the reactor, respectively. Condenser 7 may be used to cool down the temperature of mixture from the spiral reactor 10 before the solid gets separated from liquid in the suction filtration unit 22. Other separation equipment and modes such as centrifugation may also be used to separate the carbon-supported platinum catalyst from the reaction solvent in the experiments described herein.
Figure 3:
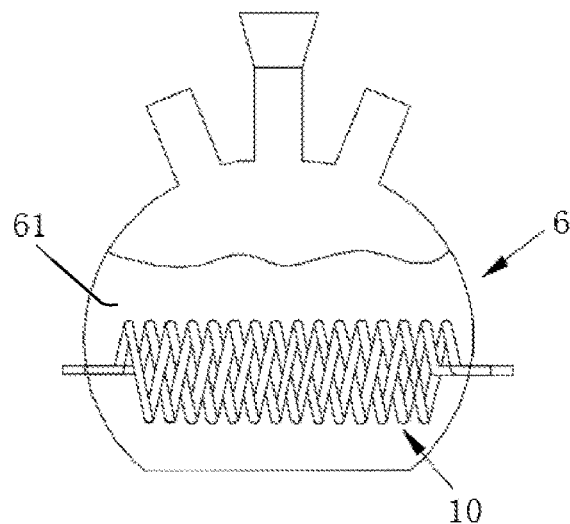
FIG. 3 is a schematic diagram showing a structure of the spiral glass tube reactor having two concurrent spiral glass tubes operable as the spiral reactor 10 shown in FIG. 2, wherein the two spiral glass tubes are configured in the flask 6, with the heating oil 61 filled. In other words, more than one spiral tubes may be configured as the spiral tube reactor 10 to attain more uniform heat distribution and increase production rate of the carbon-supported platinum catalyst.

The following detailed description refers to the accompanying drawings that show, by way of illustration, specific details and embodiments in which the invention may be practised. These embodiments are described in sufficient detail to enable those skilled in the art to practice the invention. Other embodiments may be utilized and changes may be made without departing from the scope of the invention. The various embodiments are not necessarily mutually exclusive, as some embodiments can be combined with one or more other embodiments to form new embodiments.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure provides for a composite catalyst and its method of production. The composite catalyst is suitable for use in fuel cells, such as proton exchange membrane fuel cells. The composite catalyst may comprise two catalytic materials. The first catalytic material may be a non-precious metal nitrogen-doped carbon catalyst. An example may be a non-precious transition metal nitrogen-doped carbon catalyst, which may be termed herein as "non-precious transition metal nitrogen-containing carbon catalyst". The second catalytic material may comprise a carbon-based supported platinum catalyst. The second catalytic material may be termed herein as a carbon-based supported platinum catalyst because it may contain platinum particles supported on the carbon material.

The present composite catalyst is advantageous for use in fuel cells as the present composite catalyst provides for higher catalytic activity. For example, the present composite catalyst may be operated as a catalyst for the cathode of a fuel cell, thereby providing better oxygen reduction rate. Advantageously, the present composite catalyst has the improved catalytic activity even when it contains a lower amount of platinum compared to conventional platinum catalyst and platinum-based catalyst. This also means the present composite catalyst may not only be cheaper compared to conventional platinum and platinum-based catalysts, but also provides better catalyst performance for a lower cost.

The improved catalytic activity of the present composite catalyst is not compromised even when operated at low temperatures, rendering the present composite catalyst advantageously usable in fuel cells that require operation at low temperatures. Said differently, the present composite catalyst is chemically stable when operated in different conditions, rendering it usably versatile. Advantageously, the present composite catalyst has a long-term chemical stability, which reduces the need to frequently replace such catalyst. Even with the lower platinum content, the present composite catalyst does not become more susceptible to catalyst poisoning.

The advantages mentioned above apply to the method disclosed herein for producing the present composite catalyst. For example, the present method is advantageous as it allows for a lower amount of platinum to be used to produce the present composite catalyst having a higher catalytic activity for oxygen reduction reaction.

As already mentioned above, the present disclosure relates to two catalytic materials, one of the catalytic materials being the non-precious transition metal nitrogen-doped carbon catalyst. The term "doped" herein means the nitrogen atoms are incorporated into the carbon structure such that chemical and/or physical properties of the original carbon material changes. The nitrogen atoms may displace the carbon atoms, or be bonded to one or more carbon atoms therein, or be chemically absorbed to one or more carbon atoms therein. In any case, the term "doped" means the nitrogen-doped carbon is not a physical mixture of nitrogen and carbon.

The term "non-precious" herein refers to metals and transition metals that are relatively common and inexpensive. Non-precious metals and non-precious transition metals may exclude rhodium, palladium, platinum, ruthenium, iridium, gold, silver, and osmium. Non-precious metals and non-precious transition metals may include a metal or a transition metal, respectively, from groups 3 to 12 of the periodic table except for the noble metals mentioned above.

The non-precious transition metal nitrogen-doped carbon catalyst, which constitutes the first catalytic material, is advantageous as it is not only compatible for use with the second catalytic material, but also produces a synergistic effect in combination with the second catalytic material. Not all catalytic materials are compatible but the present composite catalyst formed of these two catalytic materials has the advantages mentioned above, one of which includes improved catalytic activity with respect to oxygen reduction reaction. The non-precious transition metal nitrogen-doped carbon catalyst also aids in reducing or circumventing the amount of platinum and other rare expensive metals used, rendering a lower cost and yet a catalyst having higher catalytic activity.

Advantages of the first catalytic material are applicable to its method of production as disclosed herein, one of which includes the use of a lower amount of platinum to produce the present composite catalyst having a higher catalytic activity for oxygen reduction reaction.

Details of the present composite catalyst, the first catalytic material, their methods of making, and their various embodiments are described as follows.

In the first aspect of the present disclosure, there is provided for a composite catalyst comprising a first catalytic material incorporated with a second catalytic material, wherein the first catalytic material comprises carbon doped with (i) nitrogen and (ii) at least one non-precious transition metal, and wherein the second catalytic material comprises carbon-based supporting materials incorporated with platinum nanoparticles. As a non-limiting example of the present composite catalyst, the first catalytic material may be mixed with the second catalytic material, with or without the presence of an ionomer as a binding agent, wherein the ionomer may be, without being limited to, perfluorinated sulfonic acid resin (PFSA).

In various embodiments, the first catalytic material may be porous. The porosity of the first catalytic material not only increases surface area thereof, but also renders more transmission channels for electron and reactants or products, which enhances the catalytic activity of the first catalytic material. The term "transmission channels" herein refer to pores or spaces, for example, in a material which reactants and products, such as oxygen or water, may diffuse or migrate through. This means the reactants and products may move through such transmission channels present in, for example, the first catalyic material, the present composite catalyst, or even a catalyst layer present in a membrane. The term "transmission channels" herein also refers to, in suitable context of the present disclosure, pathways for conductive flow of electrons or proton-conductive pathways in the presence of a solid electrolyte.

In various embodiments, the at least one non-precious transition metal may be present in the first catalytic material in an amount ranging from 0.1 wt % to 20 wt %, 0.5 wt % to 20 wt %, 1 wt % to 20 wt %, 5 wt % to 20 wt %, 10 wt % to 20 wt %, 15 wt % to 20 wt %, etc., of the first catalytic material. The amount of non-precious transition metal may differ for different batches, if needed. In other words, every batch of samples need not contain the same amount of the at least one non-precious transition metal, as long as the amount falls within one of the ranges specified above. In fact, the amount of non-precious metals and transition metals may be 7 wt % or less. Said differently, even a high amount of non-precious metals and transition metals may not be required, and bearing in mind that already less platinum may be used to form the present composite catalyst.

In various embodiments, the at least one non-precious transition metal may comprise cobalt, copper, iron, molybdenum, and/or nickel. Other non-precious metal and non-precious transition metals compatible with the second catalytic material and suitable for production by the present method described further below may be employed.

As for the second catalytic material of the present composite catalyst, the platinum nanoparticles may be formed on the carbon-based supporting material. The carbon-based supporting material may comprise carbon particles, carbon nanotubes, graphenes, or a mixture thereof. In various embodiments, the platinum nanoparticles may comprise an average diameter ranging from 1.6 nm to 10 nm, 2 nm to 10 nm, 3 nm to 10 nm, 4 nm to 10 nm, 5 nm to 10 nm, 6 nm to 10 nm, 7 nm to 10 nm, 8 nm to 10 nm, 9 nm to 10 nm, etc., and/or the platinum nanoparticles may be present in an amount ranging from 5% to 80%, 10% to 80%, 20% to 80%, 30% to 80%, 40% to 80%, 50% to 80%, 60% to 80%, 70% to 80%, etc., by mass of the second catalytic material. Such ranges of platinum nanoparticles may be advantageous for attaining a desired specific catalytic activity and current density of the second catalytic material, and hence those of the present composite catalyst.

In the present composite catalyst, the first catalytic material and the second catalytic material may be present in a mass ratio of 5:95 to 95:5, 10:90 to 90:10, 20:80 to 80:20, 30:70 to 70:30, 40:60 to 60:40, 50:50, etc.

The present composite catalyst may further comprise an ionomer, wherein the ionomer comprises nafion, perfluorinated sulfonic acid, sulfonated tetrafluoroethylene, or a mixture thereof. The ionomer may serve as a binding agent and may be present in the resultant composite catalyst. Others ionomers suitable for binding the various components to form the present composite catalyst may be used.

In another aspect of the present disclosure, there is provided for a method of producing a composite catalyst comprising a first catalytic material incorporated with a second catalytic material, wherein the first catalytic material comprises carbon doped with (i) nitrogen and (ii) at least one non-precious transition metal, and wherein the second catalytic material comprises a carbon-based supporting material incorporated with platinum nanoparticles. The method may comprise providing a mixture comprising the first catalytic material and the second catalytic material, and subjecting the mixture to a size reduction step. The size reduction step of the present method may be or may include an extensive mixing step. In other words, extensive mixing of the first catalytic material and the second catalytic material may occur in the size reduction step, or during size reduction of the components in the mixture. Embodiments and advantages described for the composite catalyst of the first aspect can be analogously valid for the method of producing the composite catalyst as described herein, and vice versa. As the various embodiments and advantages have already been described above, they shall not be iterated for brevity.

Advantageously, the size reduction step of the present method, which may also mix extensively the various components, decreases the size of the resultant composite catalyst to increase its surface area so as to have the composite catalyst provide for more catalytic activity. The size reduction step advantageously renders distribution of the first catalytic material and second catalytic material, and/or an ionomer, more uniformly in the resultant composite catalyst. Non-limiting examples of the size reduction step may include ball milling the mixture of the first and the second catalytic materials, and/or exposing the mixture to ultrasonication. Other size reduction means that reduces size of the resultant composite catalyst and renders a more uniform distribution of the various components forming the resultant composite catalyst may be used.

The present method of producing the composite catalyst may include providing a mixture of the first and the second catalytic materials. In various embodiments, providing the mixture may comprise dispersing the first catalytic material in an alcohol to form a first dispersion, dispersing the second catalytic material in an alcohol to form a second dispersion, and mixing the first dispersion and the second dispersion to form the mixture.

Dispersing the first catalytic material in the alcohol may comprise dispersing an ionomer in the alcohol to form the first dispersion, and/or dispersing the second catalytic material in the alcohol may comprise dispersing an ionomer in the alcohol to form the second dispersion. The ionomer may comprise nafion, perfluorinated sulfonic acid, sulfonated tetrafluoroethylene, or a mixture thereof. As already mentioned above, the ionomer advantageously acts as a binding agent to hold the various components together.

The alcohol to form the first dispersion and the second dispersion may comprise ethanol, iso-propanol, n-propanol, ethylene glycol, or a mixture thereof.

In various embodiments, providing the mixture may comprise forming the first catalytic material. Forming the first catalytic material may comprise dispersing a structure-directing agent in an aqueous medium, wherein the aqueous medium comprises (i) at least one metal salt and/or at least one metal oxide and (ii) at least an organic compound comprising an amine, mixing the aqueous medium and at least one non-precious transition metal precursor to form a liquid ink, drying the liquid ink to form a viscous solid, and pyrolyzing the viscous solid in an inert atmosphere to form the first catalytic material. In some embodiments, the at least one non-precious transition metal precursor may be contained in an alcoholic solution for mixing with the aqueous medium to form the liquid ink. Said differently, for these embodiments, the aqueous medium may be mixed with an alcoholic solution comprising the at least one non-precious transition metal precursor to form the liquid ink.

In various embodiments, the at least one metal salt may comprise a metal selected from the group consisting of an alkali metal and a transition metal, which may increase the surface area of the resultant non-precious transition metal catalyst or alter its structure. In various embodiments, the at least one metal oxide may comprise a metal selected from the group consisting of an alkali metal and a transition metal. Non-limiting examples of the metal salt may include sodium chloride or potassium chloride. In other words, the metal may be sodium or potassium. During the pyrolysis, the metal salts of sodium or potassium, or the at least one metal oxide, may be molten, and therefore may have a role in changing the resultant product's structure and increasing surface area of the resultant first catalytic material. Other suitable metal salts or metal oxides that provide for this effect may be used.

In various embodiments, the organic compound comprising the amine may comprise ethylenediamine, pentaethylenehexamine, or a polyamine. The organic compound provides the source of carbon and nitrogen to form the first catalytic material.

In various embodiments, the structure-directing agent may comprise a xerogel. The xerogel may comprise a silica xerogel, MCM-41, MCM-48, ZnO, an analogue thereof, or a mixture thereof. The term "xerogel" herein refers to a gel that is obtained when the liquid phase of a gel is removed by evaporation. The xerogel may retain its original shape, but cracks or pores may appear due to the extreme shrinkage arising from evaporation of liquid from the gel. A xerogel is distinguished from an aerogel in that an aerogel is obtained when the liquid phase of a gel gets replaced by a gas in such a way that its solid network is retained, with only a slight or no shrinkage in the gel. The method of removing liquid from a gel may dictate whether an aerogel or xerogel gets formed. The structure-directing agent advantageously generates pores to render a porous first catalytic material, which in turn increases surface area and produce an ordered structure. Advantage(s) of a porous first catalytic material has been described above.

In various embodiments, the aqueous medium may comprise water. Advantageously, using water allows for the dispersed structure-directing agent to be mixed with the contents of the alcoholic solution, as the water and alcoholic solution are miscible. In some embodiments, mixing the aqueous medium and the at least one non-precious transition metal precursor may comprise mixing the aqueous medium and an alcoholic solution comprising the at least one non-precious transition metal precursor. The alcoholic solution may comprise ethanol, iso-propanol, n-propanol, ethylene glycol, or a mixture thereof.

In various embodiments, the at least one non-precious transition metal precursor may comprise a cobalt salt, a copper salt, an iron salt, a molybdenum salt, and/or a nickel salt. Salts in the form of chloride, bromide, iodide, sulphate, and nitrate may be used. As a non-limiting example, the at least one non-precious transition metal precursor may comprise cobalt chloride, iron nitrate nonahydrate, and/or ammonium molybdate tetrahydrate.

As mentioned above, forming the first catalytic material may include pyrolyzing the viscous solid, which may comprise heating the viscous solid at a temperature ranging from 300° C. to 1200° C., 500° C. to 1200° C., 750° C. to 1200° C., 1000° C. to 1200° C., etc. For example, the viscous solid may be pyrolyzed at 750° C.

The method to produce the present composite catalyst may further comprise washing the first catalytic material with an alkali, washing the first catalytic material with an acid, and washing the first catalytic material with water, wherein washing the first catalytic material with acid may be (i) after washing with the alkali and (ii) prior to washing with water. Such a washing procedure helps to remove the catalyst more completely of residue so that the resultant composite catalyst is not contaminated.

The steps of forming the first catalytic material has been described above. In certain embodiments, forming the first catalytic material may comprise mixing a solid mixture comprising (i) at least one non-precious transition metal precursor and (ii) an organic compound comprising an imidazole, and pyrolyzing the solid mixture in an alkaline atmosphere to form the first catalytic material. The steps in such embodiments may be advantageous as it may not require use of xerogels, as the resultant first catalytic material from such embodiments may be sufficiently porous. The steps in such embodiments may utilize ZnO instead of MCM-based structure-directing agents such as MCM-41 since ZnO is able to directly evaporate away during the pyrolysis. In such embodiments, mixing the solid mixture may comprise (i) ball milling the solid mixture or (ii) mixing the solid mixture in a liquid medium. Mixing of the solid mixture in the liquid medium may include use of ultrasonic techniques or a combination of ball milling and ultrasonic techniques. An example of a first catalytic material produced by the steps of such embodiments may include, but is not limited to, an iron cobalt nitrogen-doped carbon ($Fe_2Co_2N$—C) catalyst. The liquid medium, if employed, may be or may contain an alcohol or a solution of alcohol and water.

In such embodiments, the at least one non-precious transition metal precursor may comprise a cobalt salt, a copper salt, an iron salt, a molybdenum salt, and/or a nickel salt. Salts in the form of chloride, bromide, iodide, sulphate, and nitrate may be used. As a non-limiting example, the at least one non-precious transition metal precursor may comprise cobalt (II) chloride, iron (III) nitrate nonahydrate, and/or ammonium molybdate tetrahydrate.

The organic compound comprising an imidazole may comprise 2-methylimidazole, benzimidazole, or a mixture thereof. The organic compound advantageously provides for a source of carbon and nitrogen.

In such embodiments, pyrolyzing the solid mixture may comprise heating the solid mixture in the alkaline atmosphere at a temperature ranging 300° C. to 1200° C., 500° C. to 1200° C., 750° C. to 1200° C., 1000° C. to 1200° C., etc. For example, the viscous solid may be pyrolyzed at 750° C.

As already mentioned above, the present method of producing the composite catalyst may comprise providing a mixture of the first and the second catalytic materials. In various embodiments, providing the mixture may comprise forming the second catalytic material. Forming the second catalytic material may comprise mixing a carrier ink and a precursor solution, adding a base to render a pH greater than 10, and heating the carrier ink and the precursor solution to form the second catalytic material. At this stage, heating the carrier ink and the precursor may form a mixture, e.g. a liquid mixture, containing the second catalytic material and any of the solvents used.

In various embodiments, mixing the carrier ink and the precursor solution may comprise dispersing the carbon-based supporting material in an alcohol to form the carrier ink, and mixing a platinum precursor and a (i) citrate or (ii) citric acid in an alcohol to form the precursor solution.

The alcohol to form the carrier ink and the precursor solution may comprise ethanol, iso-propanol, n-propanol, ethylene glycol, or a mixture thereof. The carbon-based supporting material may comprise carbon powder, graphene, carbon nanotubes, or a mixture thereof.

The platinum precursor may comprise chloroplatinic acid, potassium chloroplatinate, platinum nitrate, or a mixture thereof. Other soluble platinum compound may be used.

The citrate may comprise sodium citrate or potassium citrate. These citrates are advantageous as they are compatibly soluble in the solvent used to dissolve the platinum precursor, i.e. does not render precipitation of the platinum precursor.

In various embodiments, the heating of the carrier ink which may be mixed with the precursor solution, may be carried out at a temperature ranging from 100° C. to 250° C., 150° C. to 250° C., 200° C. to 250° C., etc.

The steps of forming the second catalytic material may further comprise separating the second catalytic material from, for example, the liquid solution and/or other materials dissolved therein, to obtain a solid form of the second catalytic material after adjusting the liquid solution to have a pH in the acidic range, wherein the adjusting is carried out after the heating. The pH adjustment to acidic range favours the solid separation of the second catalytic material. Said differently, the steps of forming the second catalytic material may further include separating the second catalytic material to obtain a solid form of the second catalytic material after precipitating the second catalytic material by subjecting the second catalytic material to a pH in the acidic range, wherein the precipitating is carried out after heating of the carrier ink and the precursor solution.

The present disclosure also provides for a non-precious transition metal catalyst comprising carbon doped with (i) nitrogen and (ii) at least one non-precious transition metal. Such a catalyst, as already mentioned above, may be interchangeably termed herein a "transition metal nitrogen-doped carbon catalyst" and as the first catalytic material.

Embodiments and advantages described for the composite catalyst of the first aspect and its method of production can be analogously valid for the present non-precious transition metal nitrogen-doped carbon catalyst as described herein, and vice versa. As the various embodiments and advantages have already been described above, they shall not be iterated for brevity.

For example, it has already been described above that the first catalytic material comprising the non-precious transition metal nitrogen-doped catalyst may be porous. In the present disclosure, the terms "first catalytic material" and "non-precious transition metal nitrogen-doped carbon catalyst" herein may be interchangeably used with "non-precious transition metal catalyst". In various embodiments, the at least one non-precious transition metal may be present in an amount ranging from 0.1 wt % to 20 wt % of the first catalytic material. Other embodiments of the ranges have already been described above. In various embodiments, the at least one non-precious transition metal may comprise cobalt, copper, iron, molybdenum, and/or nickel.

The present disclosure further provides for a method of producing a non-precious transition metal catalyst, the method may comprise dispersing a structure-directing agent in an aqueous medium, wherein the aqueous medium comprises (i) at least one metal salt and/or at least one metal oxide and (ii) at least an organic compound comprising an amine, mixing the aqueous medium and at least one non-precious transition metal precursor to form a liquid ink, drying the liquid ink to form a viscous solid, and pyrolyzing the viscous solid in an inert atmosphere to form the non-precious transition metal catalyst. Embodiments and advantages described for the composite catalyst of the first aspect and its method of production, and the non-precious transition metal catalyst, can be analogously valid for the present method of producing the non-precious transition metal catalyst as described herein, and vice versa. As the various embodiments and advantages have already been described above, they shall not be iterated for brevity.

For example, the at least one metal salt may comprise a metal selected from the group consisting of an alkali metal and a transition metal. The at least one metal oxide may comprise a metal selected from the group consisting of an alkali metal and a transition metal. The at least one metal salt and/or at least one metal oxide used in producing the non-precious transition metal catalyst may increase the surface area of the non-precious transition metal catalyst. Non-limiting examples of the metal salt may include sodium chloride or potassium chloride. In other words, the metal may be sodium or potassium. The organic compound comprising the amine may comprise ethylenediamine, pentaethylenehexamine, or a polyamine. The structure-directing agent may comprise a xerogel, wherein the xerogel comprises a silica xerogel, MCM-41, MCM-48, ZnO, an analogue thereof, or a mixture thereof. The aqueous medium may comprise water. Mixing of the aqueous medium and the at least one non-precious transition metal precursor may comprise mixing the aqueous medium and an alcoholic solution comprising the at least one non-precious transition metal precursor, in some embodiments. The alcoholic solution may comprise ethanol, iso-propanol, n-propanol, ethylene glycol, or a mixture thereof. The at least one non-precious transition metal precursor may comprise a cobalt salt, a copper salt, an iron salt, a molybdenum salt, and/or a nickel salt. Salts in the form of chloride, bromide, iodide, sulphate, and nitrate may be used. As a non-limiting example, the at least one non-precious transition metal precursor may comprise cobalt (II) chloride, iron (III) nitrate nonahydrate, and/or ammonium molybdate tetrahydrate.

Pyrolyzing the viscous solid may comprise heating the viscous solid at a temperature ranging from 300° C. to 1200° C., wherein other temperature ranges have already been described in various embodiments above.

The method of this aspect may further comprise washing the non-precious transition metal catalyst with an alkali, washing the non-precious transition metal catalyst with an acid, and washing the non-precious transition metal catalyst with water, wherein washing the non-precious transition metal catalyst with acid is (i) after washing with the alkali and (ii) prior to washing with water. These steps have already been described above with respect to the steps for forming the first catalytic material.

The present disclosure further provides for another method of producing the non-precious transition metal catalyst, the method may comprise mixing a solid mixture comprising (i) at least one non-precious transition metal precursor and (ii) an organic compound comprising an imidazole, and pyrolyzing the solid mixture in an alkaline atmosphere to form the non-precious transition metal catalyst. The steps in such embodiments may be advantageous as it may not require use of xerogels, as the resultant first catalytic material from such embodiments may be sufficiently porous. The steps in such embodiments may utilize ZnO instead of MCM-based structure-directing agents such as MCM-41 since ZnO is able to directly evaporate away during the pyrolysis. In such embodiments, mixing the solid mixture may comprise (i) ball milling the solid mixture or (ii) mixing the solid mixture in a liquid medium. The liquid medium may be or may contain an alcohol or a solution of alcohol and water. An example of a first catalytic material produced by the steps of such embodiments may include, but is not limited to, an iron cobalt nitrogen-doped carbon ($Fe_2Co_2N$—C) catalyst. Embodiments and advantages described for the composite catalyst of the first aspect and its method of production, and the non-precious transition metal catalyst, can be analogously valid for the present method of producing the non-precious transition metal catalyst as described herein, and vice versa. As the various embodiments and advantages have already been described above, they shall not be iterated for brevity.

For example, mixing of the solid mixture may comprise (i) ball milling the solid mixture or (ii) mixing the solid mixture in a liquid medium. The at least one non-precious transition metal precursor may comprise a cobalt salt, a copper salt, an iron salt, a molybdenum salt, and/or a nickel salt. Salts in the form of chloride, bromide, iodide, sulphate, and nitrate may be used. As a non-limiting example, the at least one non-precious transition metal precursor may comprise cobalt (II) chloride, iron (III) nitrate nonahydrate, and/or ammonium molybdate tetrahydrate. The organic compound comprising an imidazole may comprise 2-methylimidazole, benzimidazole, or a mixture thereof. Pyrolyzing the solid mixture may comprise heating the solid mixture in the alkaline atmosphere at a temperature ranging from 300° C. to 1200° C., wherein other temperature ranges have already been described in various embodiments above.

In the present disclosure, the word "substantially" does not exclude "completely" e.g. a composition which is "substantially free" from Y may be completely free from Y. Where necessary, the word "substantially" may be omitted from the definition of the invention.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

While the methods described above are illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

EXAMPLES

The present disclosure relates to a low-cost composite catalyst suitable for use in fuel cells. The composite catalyst may contain non-precious metal carbon catalysts and carbon-supported nanosized platinum catalysts. The present disclosure relates to methods of making such catalysts.

Platinum possesses a unique combination of an electronic structure well-suited for oxidation-reduction (redox) catalysis, as well as excellent chemical stability. This renders platinum-based catalysts, supported or unsupported, suitable for fuel cell applications, in particular, low-temperature operated fuel cells such as proton exchange membrane fuel cells that are fuelled by hydrogen-rich gases or small-molecular alcohols. However, the low availability and high cost for platinum have retarded the commercialization of low-temperature fuel cells. The composite catalyst and method disclosed herein minimize the use of platinum in a catalyst operable in low-temperature fuel cells and electrolysers.

Specifically, the present low-cost composite fuel cell catalysts is made up of two catalytic materials, including (1) a non-precious transition metal nitrogen-doped carbon catalyst and (2) a carbon-based supported platinum catalyst. (1) may contain at least one transition metal and nitrogen in the carbon structure. (2) may contain nanosized platinum supported on carbon materials.

In particular, the present composite catalyst may be used as a fuel cell cathode catalyst for oxygen reduction, as it has high activity and is resistant to poisoning effect. The present composite catalyst has a higher activity despite containing a lower amount of platinum compared to conventional platinum catalyst.

Details of the present composite catalyst, the two catalytic materials forming the composite catalyst, and methods of producing the composite catalyst and two catalytic materials, are further discussed, by way of non-limiting examples set forth below.

Example 1: Materials

Some of the materials used in the non-limiting examples described further below are as follows.

Platinum precursors for forming the carbon-supported platinum catalyst, includes but are not limited to, chloroplatinic acid, potassium chloroplatinate, platinum nitrate, etc.

Citrate or citric acid for forming the carbon-supported platinum catalyst were also used.

Perfluorinated sulfonic acid (PFSA)-containing ion exchange resin or ionomer solution, such as but not limited to, Nafion solution (a Nafion dispersion—alcohol-based solution at 5 wt % or other concentration), or similar PFSA-containing ionomer products from Asahi-Kasei, etc. are used as binding agents. Binding materials used may also include but are not limited to polytetrafluoroethylene or ion exchange resins such as the PFSA-containing resins.

Solvents used include but are not limited to deionized (DI) water, alcohols such as ethanol, iso-propanol, n-propanol, ethylene glycol, or a mixture thereof.

Amines used include but are not limited to ethylenediamine (EDA), pentaethylenehexamine (PEHA), and other polyamine organic compounds.

Metal precursors used include but are not limited to as cobalt (II) chloride, cobalt (II) acetylacetonate (abbreviated as $Co(ACAC)_2$), iron (III) nitrate nonahydrate, and other transition metal compounds.

Supporting materials used may include carbon powder, graphene, carbon nanotube, mixed or composite carbon materials, and other carbon materials.

Structure-directing agents used include MCM-41, MCM-48, MCM-41, an analogue thereof, disordered silica xerogels, and ZnO.

Glucose may be optionally used for forming the non-precious transition metal nitrogen-doped carbon catalyst.

Metal chloride used may include sodium chloride, potassium chloride, and other metallic chloride or the oxides of these metals.

Basic solutions such as sodium hydroxide, potassium hydroxide, etc. may be used to prepare alkaline electrolytes for catalyst testing and to modify the platinum precursor solution pH value.

Example 2: General Description of Method of Forming the Various Catalysts

The present method includes making of a fuel cell cathode catalyst, wherein the method may include the steps of (i) preparing of a non-precious transition metal catalyst containing at least one transition metal and nitrogen, (ii) synthesis of a nanosized platinum particles supported on carbon materials, and (iii) preparing the composite catalyst.

With regard to (i), under an inert gas (such as argon or nitrogen) environment, an amino-containing compound, transition metal salt(s), a silica xerogel, a metallic chloride, and optionally glucose, may be mixed and then pyrolyzed to form the non-precious transition metal nitrogen-doped carbon catalyst usable in fuel cells operating at low temperatures. To be more specific, the method of making the non-precious transition metal carbon cathode catalyst for use in fuel cells may include: (1) preparing a solid mixture comprising at least one amino-containing compound, at least one transition metal salt; at least one silica xerogel, a metallic chloride, and optionally glucose, (2) pyrolyzing the solid mixture of (1) under a substantially inert atmosphere at a certain temperature, (3) washing the non-precious transition metal(s) nitrogen-containing carbon catalyst with an alkali aqueous solution, an acidic aqueous solution, and deionized water in sequence so as to remove the silica xerogel, superfluous metal, and other impurities, and (4) drying to obtain the porous non-precious transition metal nitrogen-containing carbon catalyst. The non-precious transition metal nitrogen-containing carbon catalyst may be interchangeably termed herein as "non-precious transition metal nitrogen-doped carbon catalyst" and "first catalytic material".

The present disclosure also provides for a method to synthesize a platinum-based catalyst formed of nanosized platinum particles supported on carbon materials. Such a catalyst may be interchangeably termed herein as "carbon-based supported platinum catalyst" and "second catalytic material". The carbon-based supported platinum catalyst synthesis includes: (1) mixing and dispersion of supporting materials and ethylene glycol to form an uniform carrier ink, (2) adding metallic precursors and citrate at an appropriate proportion into ethylene glycol to make a precursor solution, (3) adding the precursor solution to the carrier ink of (1) and modifying the pH value therein to more than 10 by addition of an alkaline, (4) transferring the mixture of (3) to a spiral tube reactor heated by microwave to reduce and deposit the metallic nanoparticles onto the carrier surface. The metallic (platinum) nanoparticles supported on the carrier (such as carbon) may be separated from the liquid by means of a centrifugal machine or other separation apparatus, washed copiously and freeze-dried to get the final product (e.g. the ultrafine platinum nanoparticles supported on carbon materials).

The present disclosure provides for a method to prepare the composite catalyst. The composite catalyst may be termed herein as "composite electrocatalyst". The method may include (1) separately dispersing in alcohol (i) the nanosized carbon-based supported platinum catalyst and (ii) the non-precious transition metal nitrogen-doped carbon catalyst to form two separate inks, (2) optionally adding selected surfactants such as sulfonated tetrafluoroethylene (or other PFSA-containing ionomer) into the ink of (ii), (3) mixing the two inks of (i) and (ii), and (4) grounding the two inks in a ball-mill for at least 30 minutes. Finally, the solid mixture may be centrifugalized to separate from the liquids, and freeze-dried, and/or further dried, if needed, at a low temperature (less than 250° C.) in nitrogen atmosphere to fully remove any solvents.

The composite catalyst may be characterized and tested in an electrochemical cell (half-cell testing), and coated onto a membrane to obtain a catalyst-coated membrane (CCM), which may be further characterized, or measured, in a single cell kit as described herein.

In half-cell testing, the catalyst sample may be placed onto a glassy carbon electrode to get a thin catalyst layer, which may then be tested in an alkali electrolyte (such as 0.1 mole per liter potassium hydroxide aqueous solution) at room temperature (26° C.). High purity nitrogen may be bubbled into the electrolyte to de-aerate before cyclic voltammetry measurement and to cover the electrolyte solution.

For preparation of the CCM, the catalyst sample may be dispersed in a solution of mixed alcohols, an alcohol-water solution containing sulfonated tetrafluoroethylene and other chemicals, to get a catalyst ink, which may then be directly sprayed onto selected Nafion membrane.

Example 3: Synthesis of CoN—C Non-Precious Transition Metal Nitrogen-Doped Carbon Catalyst To synthesize a non-precious transition metal nitrogen-doped carbon catalyst containing cobalt and nitrogen (CoN—C), cobalt (II) chloride hexahydrate (CoCl$_2$·6H$_2$O) was employed as the cobalt precursor (2.1 g) and pentaethylenehexamine was employed (4.4 g) as source of carbon and nitrogen.

Firstly, pentaethylenehexamine was dissolved in a sodium chloride (12.0 g) aqueous solution (50.0 mL), after which, 2.5 g of MCM-41 was added therein. The mixture was stirred vigorously for 2 hours. After that, cobalt (II) chloride hexahydrate is added into the solution, the mixed slurry was ultrasonically dispersed and stirred vigorously overnight, then the liquid was evaporated using a rotary evaporator at 50° C. The viscous black solid obtained was then dried in an oven and heat-treated in a tube furnace at 750° C. for 2 hours in high-purity nitrogen with a heating rate of 2° C./min. The black sample was collected and washed in sodium hydroxide solution, sulphuric acid solution and DI water, in sequence. The cobalt and nitrogen-doped carbon catalyst product was finally collected after drying at 120° C. overnight.

Example 4: Synthesis of MoCoN—C Non-Precious Transition Metal Nitrogen-Doped Carbon Catalyst 20.0 g of sodium chloride was dissolved in 100 mL DI water, into which pentaethylenehexamine (9.0 g) is added dropwise. The solution was stirred for 1.5 hours, then ultrasonically dispersed for at least 2 hours after 15.0 g of MCM-41 was added into the solution to get uniform MCM-41 suspension. An ethanol solution containing 2.2 g cobalt (II) chloride hexahydrate (CoCl$_2$·6H$_2$O) and 1.6 g ammonium molybdate tetrahydrate ((NH$_4$)$_6$Mo$_7$O$_{24}$·4H$_2$O) was added dropwise into the MCM-41 mixture suspension. The mixed suspension was stirred vigorously overnight. The liquid was then evaporated using a rotary evaporator at 50° C. The viscous black solid obtained was then dried in oven and heat-treated in tube furnace at 750° C. for 2 hours under the protection of high-purity nitrogen with a heating rate of 2° C./min. The black sample was collected, and washed in sodium hydroxide solution, sulphuric acid solution and DI water, in sequence. The non-precious transition metal nitrogen-doped carbon catalyst containing bimetal metals (Co and Mo) and nitrogen with an ordered porous structures was finally collected after drying at 120° C. overnight.

Example 5: Synthesis of Fe$_2$Co$_2$N—C Non-Precious Transition Metal Nitrogen-Doped Carbon Catalyst A solid preparation method was adopted to synthesize a Fe$_2$Co$_2$N—C non-precious transition metal nitrogen-doped carbon catalyst. The procedures are outlined as follows.

17.0 g of 2-methylimidazole, 6.5 g of ZnO powder and 0.287 g of FeC$_2$O$_4$ and 0.354 g of Co(ACAC)$_2$ are put into a ball mill pot and then grinded for 2 hours at 400 rpm. The light yellow powder obtained was transferred into an autoclave and maintained at 230° C. for 24 hours. The brown solid cake then obtained was collected and grinded again at 400 rpm for 2 hours and the yellow powder obtained was carbonized at 950° C. in an ammonia atmosphere to obtain the resultant Fe$_2$Co$_2$N—C catalyst. Such a method is advantageously facile, efficient and easy to scale up. For instance, hundreds of grams catalyst can be prepared in one or more batches.

Example 6: Synthesis of Carbon-Based Supported Platinum Catalyst

To synthesize the carbon-based supported platinum (PtC) catalyst, carbon powder (0.6 g) was dispersed into ethylene glycol (150 mL) to get an uniform carbon ink. Chloroplatinic acid hexahydrate (H$_2$PtCl$_6$·6H$_2$O, 1.05 g) and sodium citrate were added into ethylene glycol to make a precursor solution. After the precursor solution was added into the carbon ink, the mixture slurry pH was increased to 10 or more by adding sodium hydroxide. The mixture was reduced at 150° C. in a continuous flow tube reactor which was heated by microwave. The reaction was finished in 10 minutes. Subsequently, the mixture was diluted by adding DI water, centrifugalized to separate the solid from the liquid, and the solid was washed copiously by DI water and ethanol. The PtC catalyst product (with a platinum content of 40 wt %) was collected after freeze-dried for 3 days.

Example 7: Preparation of Present Composite Catalyst

To produce the composite catalyst, 0.2 g CoN—C or Fe$_2$Co$_2$N—C or MoCoN—C, as one out of the various examples, or other non-precious catalyst, was dispersed into 20 mL isopropanol to make a catalyst ink. 0.05 g PtC (40% wt platinum content) and 0.3 mL Nafion solution (5% wt ionomer solid) are dispersed into 10 mL isopropanol to make the carbon-supported platinum ink. The above inks are mixed together and grounded in ball mill for half an hour. After centrifugalization, the solid was washed and freeze dried. The mass proportion of non-precious catalyst to carbon-platinum catalyst is 80:20, or platinum content in the composite catalyst is 8% by weight. Other composites with different PtC contents are also prepared according to the same procedure.

Example 8A: General Discussion and Characterization Results

The Brunauer-Emmett-Teller (BET) surface areas of samples CoN—C, CoN—C/PtC (50:50 mass proportion), and PtC are 677.6 m$^2$/g, 420.1 m$^2$/g, and 195.7 m$^2$/g, respectively. The large BET surface area generated with the presence of MCM-41 nanoparticles and sodium chloride may help improve and promote the surface oxygen reduction reaction (ORR) active sites, the dispersion of nanosized platinum on carbon, and in turn increases the ORR performance.

Figure 4:
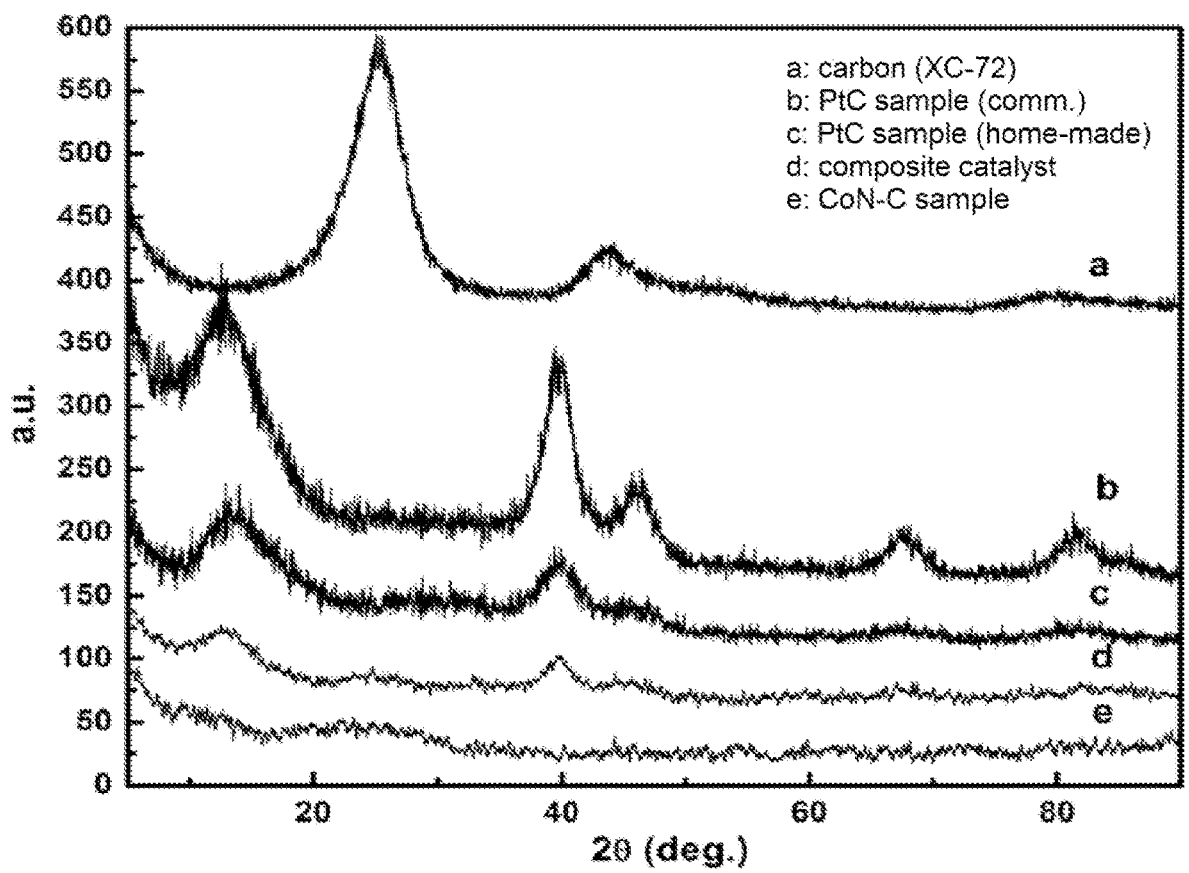
FIG. 4 shows the X-ray diffraction (XRD) characterization results of various catalyst samples made according to embodiments described herein. The term "home-made" in FIG. 4 means the PtC catalyst sample (i.e second catalytic material) was made according to a method of the present disclosure.

FIG. 4 demonstrates the XRD characterization results of selected samples. Compared to commercial (abbreviated as "comm." in FIG. 4) PtC, the present PtC sample produced by the method of the present disclosure demonstrated smaller diffraction peaks, especially the broadened (220) peak at around 67 degree, which indicates that the present PtC sample has smaller platinum particle size for the same platinum content. There was no obvious diffraction peaks for any metals or metallic oxides observed in the XRD characterization results of non-precious transition metal nitrogen-doped carbon catalysts synthesized through methods of the present disclosure as seen in spectra (e) of FIG. 4. The non-precious transition metal nitrogen-doped carbon catalysts, wherein carbon is doped with transition metals and nitrogen, demonstrates XRD characteristics similar to the starting carbon powder (see spectra (a)) employed to support the platinum. For the present composite catalyst, spectra (d) of FIG. 4 only demonstrates the further enervated diffraction peaks of platinum compared to the present PtC sample while the same characteristics of the non-precious transition metal nitrogen-doped carbon catalyst are retained.

Figure 5:
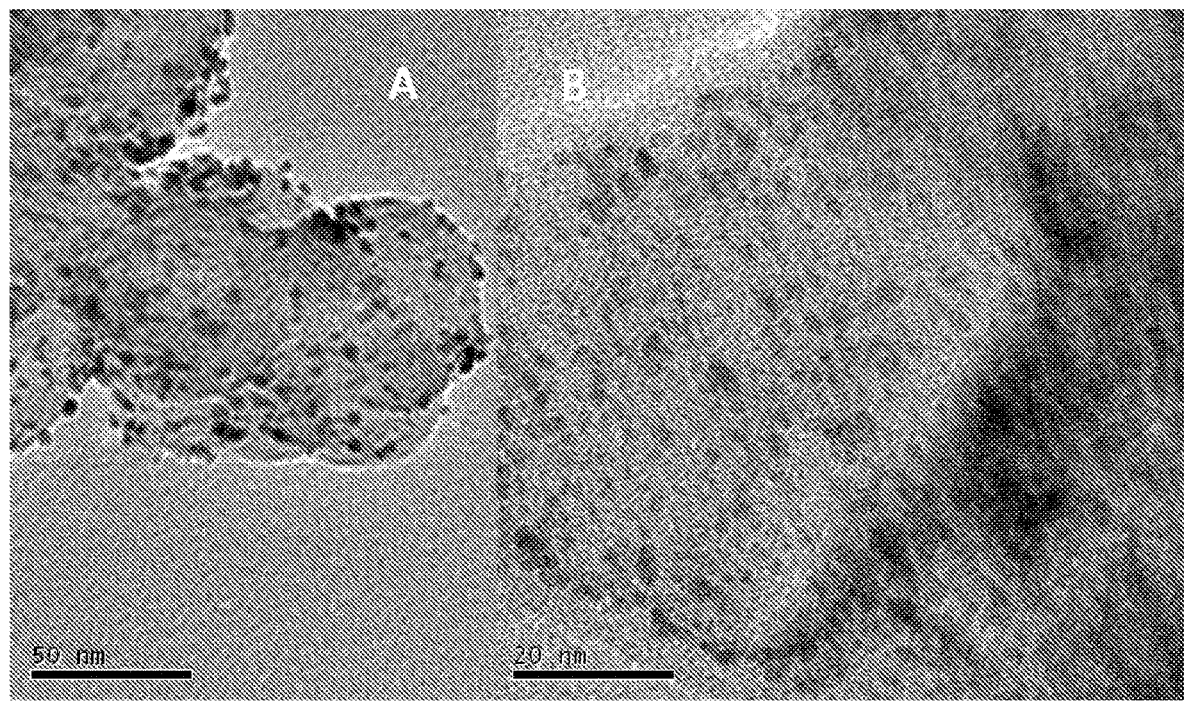
FIG. 5A is a transmission electron microscopy (TEM) image of a carbon-supported platinum nanoparticle catalyst (PtC) that is commercially available. Scale bar denotes 50 nm.
FIG. 5B is a TEM image of a carbon-supported platinum nanoparticle catalyst (PtC) that is made according to a method of the present disclosure. Scale bar denotes 20 nm.

The TEM images of different PtC samples are demonstrated in FIGS. 5A and 5B. FIG. 5A shows a TEM image of a commercial sample while the present PtC sample prepared according to the method of the present disclosure is shown in FIG. 5B, wherein both samples have about the same platinum mass content, i.e. 40 wt %. The EDS (energy dispersive X-ray spectrometer) analysis shows that the platinum content in the two samples is about 40.5 wt % and 39.1 wt %, respectively. The average particle size, based on particle size statistics from randomly selected regions, is about 2.9 nm and about 2.1 nm for the commercial and presently home-made PtC samples, respectively.

Figure 6:
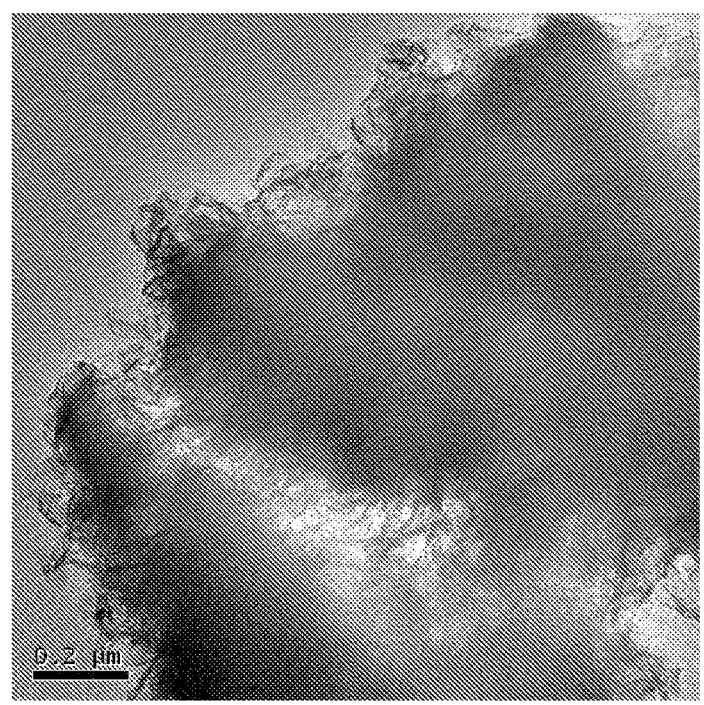
FIG. 6 is a TEM image of a non-precious transition metal carbon catalyst containing cobalt and nitrogen (CoN—C). Scale bar denotes 0.2 μm.

FIG. 6 is a TEM image of the CoN—C non-precious transition metal nitrogen-doped catalyst. The carbon material of the CoN—C catalyst produced by the method of the present disclosure has ordered nanosized pores and veins on a thin film sheet structure. Such a structure provides for transmission channels for electrons and reactants, and with the hydrophobicity of the CoN—C catalyst, enhances the activity of the non-precious transition metal nitrogen-doped carbon catalyst activity. EDS analysis demonstrates that the cobalt content is low at only about 7 wt %. Most of cobalt was washed away by acid solution during catalyst preparation.

Figure 7:
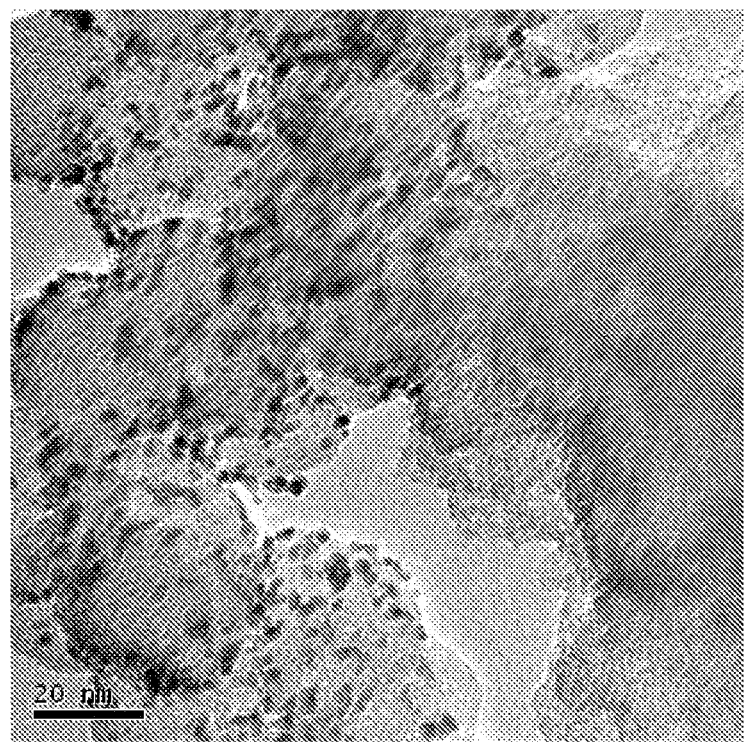
FIG. 7 is a TEM image of a composite catalyst (CoN—C/PtC) made according to a method of the present disclosure. Scale bar denotes 20 nm.

FIG. 7 shows the TEM image of composite catalyst (CoN—C/PtC) from which it can be seen that the smaller spherical carbon powders with nanosized platinum particles are assembled onto the larger thin film sheet carbon structures. This combination is an example of the present composite catalyst, and in this instance, containing (i) the non-precious cobalt nitrogen-doped carbon and (ii) platinum nanoparticles supported on carbon powders.

Figure 8:
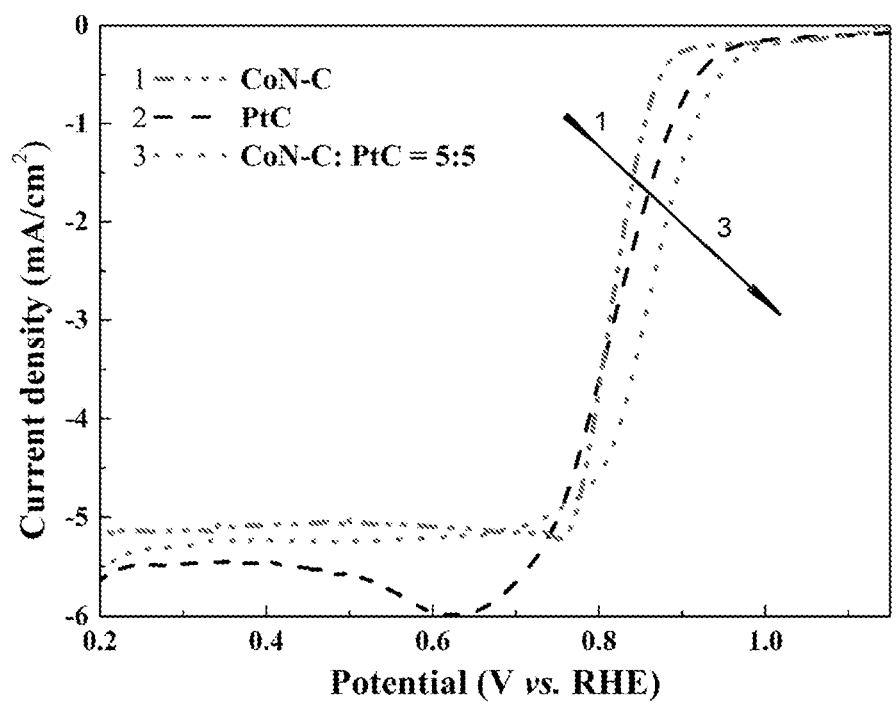
FIG. 8 shows the rotating disc electrode (RDE) testing results of different samples at room temperature in 0.1 M KOH electrolyte. The rotating speed was 1600 rpm and the potential sweep rate was 5 mV/s for all samples.

FIG. 8 demonstrates the linear scan voltammetry results of three samples (the present CoN—C catalyst, the present PtC catalyst and the present composite catalyst), from which it can be seen that the composite catalyst (CoN—C/PtC) displayed enhanced activity towards oxygen reduction reaction and shifted the half-wave potential positively in comparison to the PtC and CoN—C samples. The half-wave potential of ORR with respect to CoN—C at 0.815 V (vs RHE, same hereinafter) is shifted positively by about 65 mV to 0.87 V for CoN—C/PtC composite. Higher current at 0.95 V is produced with the CoN—C/PtC composite over other two samples. While the CoN—C and PtC catalysts may be reasonably used for applications that do not require a higher level of performance or for conditions which the catalysts may operate in, the activity of the present composite catalyst is significantly enhanced after compounding the CoN—C catalyst with a small amount of the PtC catalyst.

Figure 9:
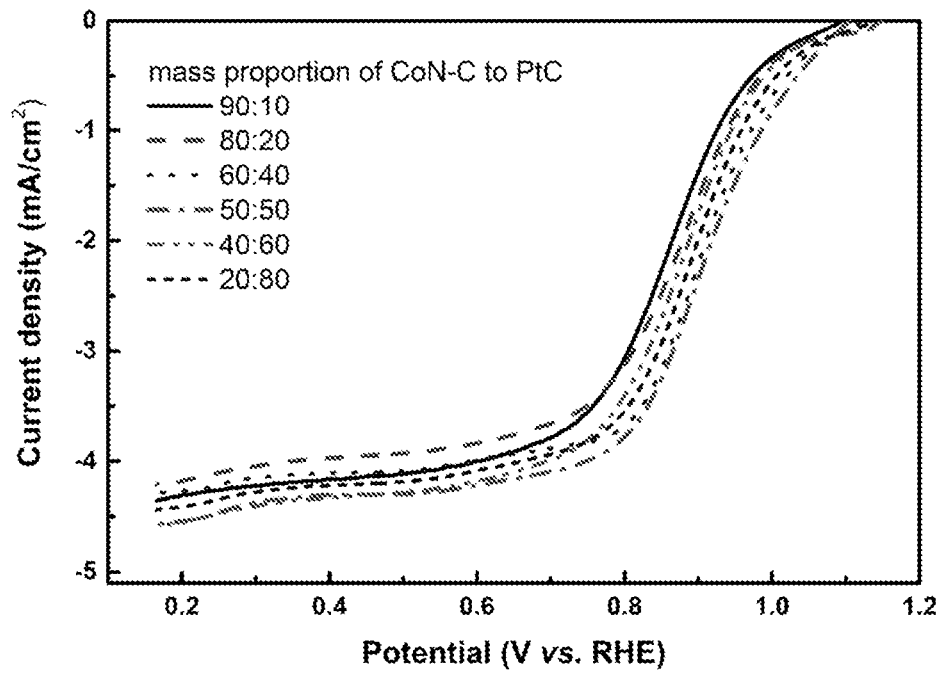
FIG. 9 shows the RDE results of composite catalysts with different CoN—C/PtC mass ratio at room temperature (e.g. 26° C.) in 0.1 M KOH electrolyte.

The results for the present composite catalysts (CoN—C/PtC) containing different mass ratio of the PtC catalytic material are shown in FIG. 9. After further analysis, the current densities at 1.05 V are listed in Table 1 below, wherein data is collected from the rotating disk electrode experiment results (FIG. 9) at 1.05 V vs RHE.

TABLE 1

Comparison of Composite Catalyst Performance Towards ORR

| Mass proportion (CoN-C:PtC) | Current density (mA · cm$^{-2}$) at 1.05 V (vs RHE) | Specific activity based on platinum (mA · mg$^{-1}$Pt) at 1.05 V (vs RHE) |
| --- | --- | --- |
| 100:0 | 0.146 | — |
| 90:10 | 0.144 | 7.07 |
| 80:20 | 0.175 | 4.29 |
| 60:40 | 0.303 | 3.71 |
| 50:50 | 0.371 | 3.64 |
| 40:60 | 0.191 | 1.56 |
| 20:80 | 0.238 | 1.46 |
| 0:100 | 0.120 | 0.59 |

Figure 10:
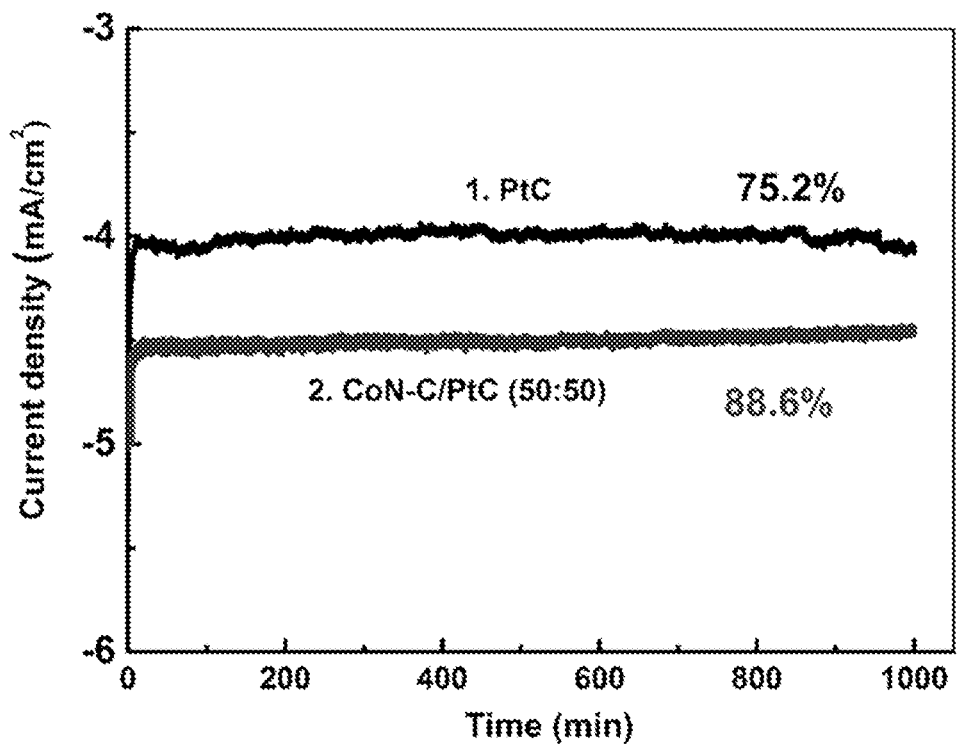
FIG. 10 shows the long-term experiment results of carbon-supported platinum nanoparticles catalyst and the composite catalyst.

It is observed that the present composite catalysts demonstrate higher activity and increase the platinum utilization compared to the PtC sample. The long-term stability performance of the typical composite catalyst are demonstrated in FIG. 10.

Figure 12A:
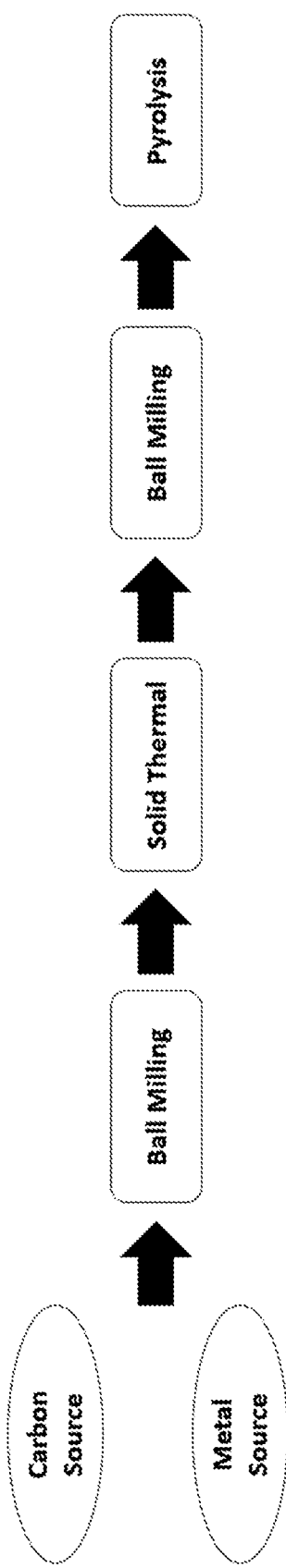
FIG. 12A is a flow diagram illustrating a solid preparation method of the present disclosure for making the non-precious transition metal nitrogen-doped carbon catalyst of Fe$_2$Co$_2$N—C.
Figure 12B:
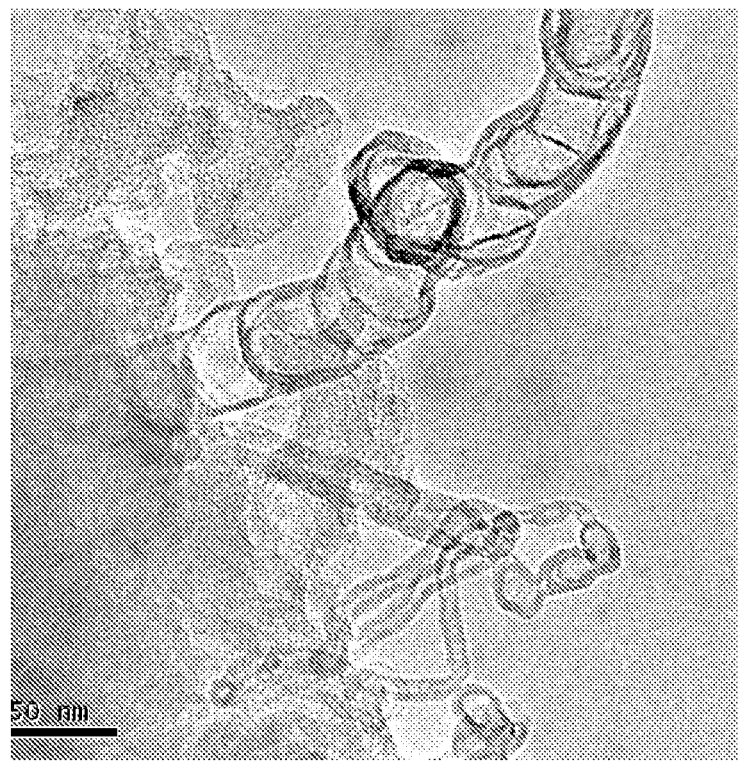
FIG. 12B is a TEM image of the Fe$_2$Co$_2$N—C catalyst. Scale bar denotes 50 nm.

Example 8B: General Discussion and Characterization Results of Fe$_2$Co$_2$N—C Catalyst The TEM image of the present Fe$_2$Co$_2$N—C catalyst is shown in FIG. 12B. The TEM image shows almost no obvious metal nanoparticles. Considering that no extra treatment were applied during its synthesis, all the metal particles are likely ultra small or even down to the size of a single atom distributed within the carbon structure. Some carbon nanotubes are formed during pyrolysis, which is an indicator of an increased degree of graphite. These nanotubes may promote conductivity and benefit O$_2$ diffusion in catalytic oxygen reduction, thereby enhancing catalytic performance.

Figure 12C:
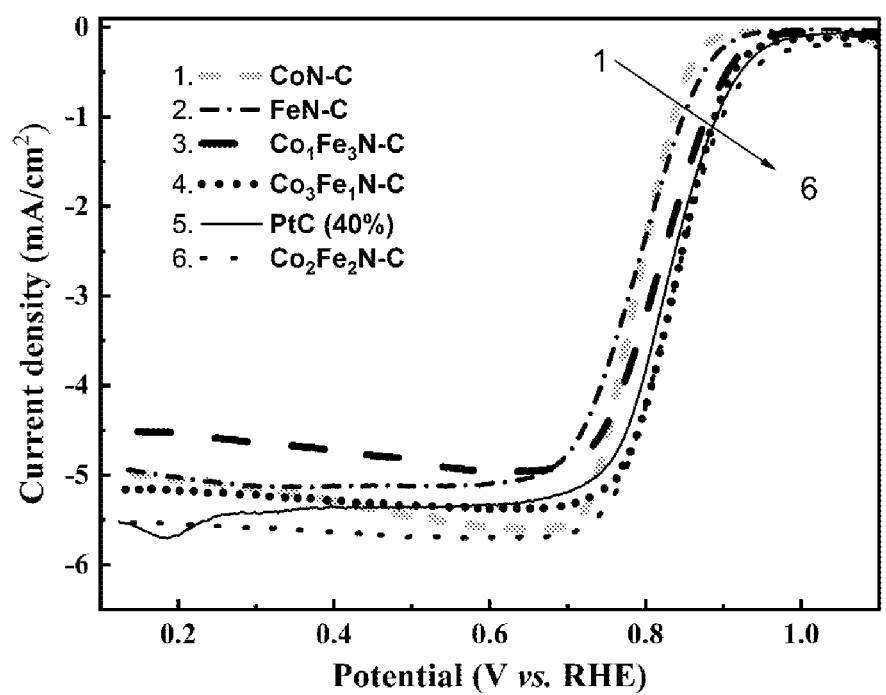
FIG. 12C shows the RDE results of various catalyst, including that of the Fe$_2$Co$_2$N—C catalyst and a commercially available 40 wt % PtC catalyst, among other Co and Fe based catalyst synthesized by the method depicted in FIG. 12A.
Figure 12D:
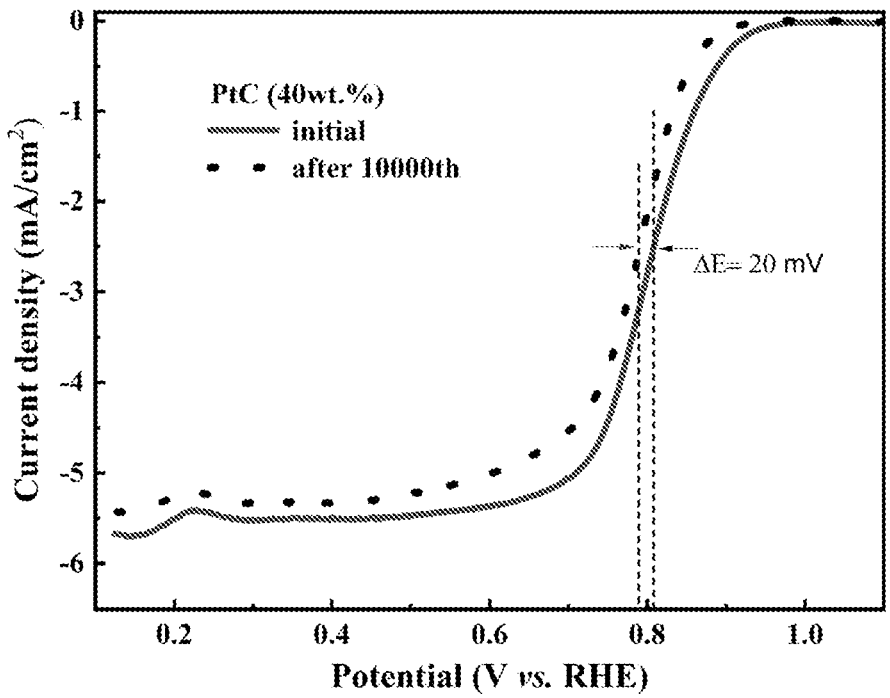
FIG. 12D shows the RDE results indicating a half wave potential shift of 20 mV after a 10000 cycle accelerate aging test of the commercially available PtC catalyst.
Figure 12E:
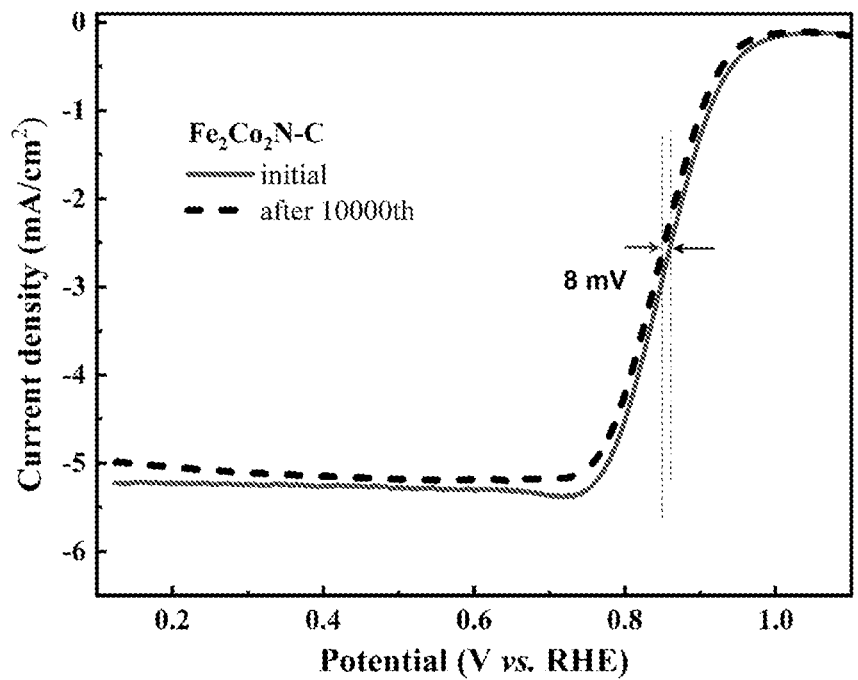
FIG. 12E shows the RDE results indicating a half wave potential shift of 8 mV after a 10000 cycle accerate aging test of the Fe$_2$Co$_2$N—C catalyst.

FIG. 12C to 12E relate to the performance of the Fe$_2$Co$_2$N—C catalyst. The Fe$_2$Co$_2$N—C catalyst shows excellent activity in the half-cell test among some other Co and Fe based catalyst synthesized by the same method, and it is also better than 40 wt % PtC. Its kinetic current density at 1.05 V is about 0.25 mA/cm$^2$ while that of PtC is only 0.12 mA/cm$^2$ at the same potential. The half-wave potential is also 70 mV more positive than that of PtC. Besides, the Fe$_2$Co$_2$N—C catalyst also possesses better stability than commercial PtC. After 10000 cycle accelerate aging test, the half-wave potential of PtC catalyst shifted negatively 20 mV while that of Fe$_2$Co$_2$N—C catalyst sample shifted negatively only by 8 mV, which demonstrates that the Fe$_2$Co$_2$N—C is undoubtably a robust catalyst having better long-term stability.

Example 8C: General Discussion and Characterization Results of the Catalyst-Coated Membrane The carbon-based supported platinum (PtC) catalyst and the composite catalyst (CoN—C/PtC) developed through methods of the present disclosure were directly coated onto a Nafion-type membrane by an ultrasonic spraying method. The platinum loadings were 0.2 mg/cm$^2$ and 0.4 mg/cm$^2$ platinum on anode and cathode, respectively. All the measurements were taken at room temperature with fixed flow rates of dry oxygen and fully humidified hydrogen at cathode and anode sides, respectively.

Figure 11:
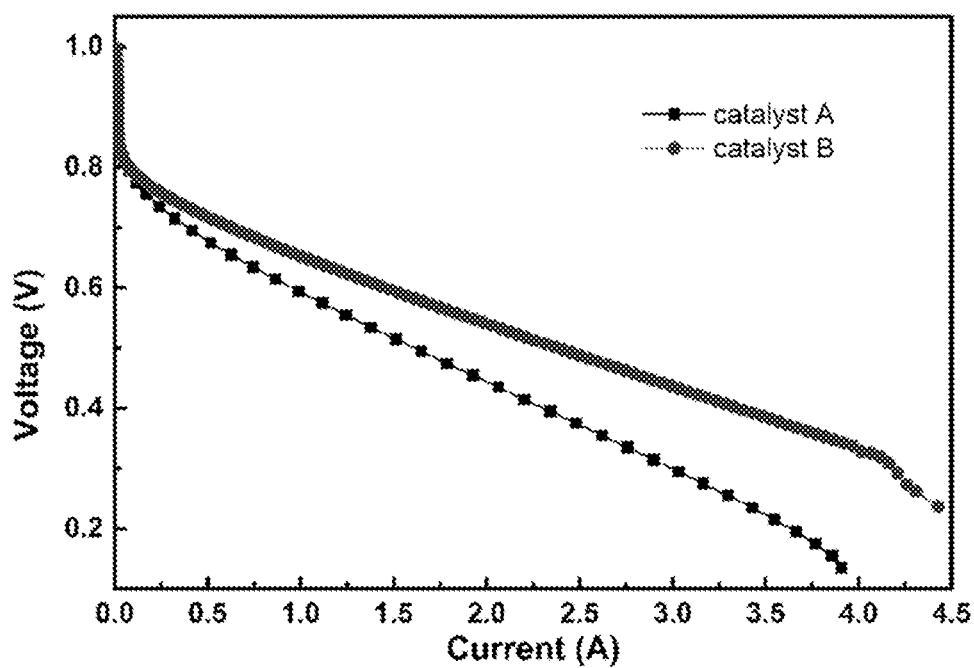
FIG. 11 shows a voltage-current plot indicating the single-cell measurement results of two catalyst-coated membranes (CCMs) made with different catalysts at room temperature (e.g. 26° C.). The catalyst-coated membrane labeled catalyst A in FIG. 11 was made with 40 wt % of PtC catalyst (40 weight percent (wt %)) and the catalyst-coated membrane labeled catalyst B was made with 50 wt % of the composite catalyst at the cathode side. CCM preparation conditions were 0.2 mg Pt/cm$^2$ for anode, 0.4 mg Pt/cm$^2$ for cathode, Nafion®-based electrolyte membrane (25.4 mm). Operation conditions include: (i) anode side: 40 sccm H$_2$ with humidification at 80° C., (ii) cathode side: 100 sccm O$_2$ with humidification at 80° C., and (iii) at room temperature (e.g. 26° C.).

FIG. 11 showed the single cell testing results with pure hydrogen. The curve represented by catalyst-coated membrane (CCM) A denotes the performance result of the CCM employing only PtC catalyst (40 wt %) for anode and cathode. The curve represented by catalyst-coated membrane (CCM) B denotes the results of the CCM made with the composite catalyst (CoN—C/PtC, 50:50). From the comparison, the catalyst-coated membrane with the present composite catalyst demonstrates better cell performance.

Example 9: Summary

The composite catalyst of the present disclosure may comprise (i) a carbon-based supported platinum catalyst which contains platinum nanoparticles supported on a carbon powder surface, and (ii) at least one non-precious transition metal nitrogen-doped carbon catalyst that has pores, wherein the non-precious transition metal nitrogen-doped carbon catalyst contains nitrogen and at least one transition metal, and (iii) optionally one electrolyte resin which contains perfluorinated sulfonic acid ionomer, such as a Nafion ionomer.

In the present composite catalyst, the mass proportion of the carbon-based supported platinum catalyst to the non-precious transition metal nitrogen-doped carbon catalyst may range from 90:10 to 10:90. The mass proportion of the composite catalyst to the electrolyte resin may range from 100:0 to 40:60.

The carbon-based supported platinum catalyst may have average platinum particles diameter ranging from 1.6 nm to 10 nm, 1.6 nm to 3.6 nm, etc. The carbon-based supported platinum catalyst may be produced in a continuous spiral tube flow reactor, of which the temperature may be controlled and maintained by microwave. The carbon-based supported platinum catalyst may have a platinum mass content not less than 20 percent of the total mass of platinum and carbon support, which may be produced by a reduction reaction wherein the ethylene glycol or its mixture solvent are used as solvent and reducing agency.

In the reduction reaction for production of the carbon-based supported platinum catalyst, which may be conducted in a temperature ranging from 110° C. to 250° C., 110° C. to 190° C., etc., the molar ratio of the platinum precursor to citrate or citrate acid may range from 20:1 to 1:5, both of which may be dissolved in the ethylene glycol or its mixture solvent, wherein the carbon support may be dispersed in the ethylene glycol or its mixture solvent.

The non-precious transition metal nitrogen-doped carbon catalyst may comprise carbon materials in which the nitrogen and the at least one non-precious transition metal are contained therein, wherein the non-precious transition metals may be selected from, but not limited to, cobalt, copper, iron, molybdenum, and/or nickel. The residual metal(s) on the carbon material surface may be washed away during the acid washing step.

The present disclosure also relates to a method to prepare a composite catalyst in a polymer electrolyte membrane for use in fuel cell. The method may include (a) dispersing a composite of at least one non-precious transition metal nitrogen-doped carbon catalyst containing the transition metal(s) and nitrogen in isopropanol or other alcohols to form a first ink, (b) dispersing the carbon-based supported platinum catalyst and Nafion solution in isopropanol or other alcohols to form a second ink, and (c) mixing the first and second catalytic material inks and subjecting them to ball milling, centrifuging, washing and freeze drying to obtain the composite catalyst of the present disclosure.

The present disclosure also provides a method to prepare the non-precious transition metal nitrogen-doped carbon catalyst, the method comprising (a) dissolving at least an amino-containing compound and sodium chloride to form a solution, wherein the amino-containing compound in may be selected from, but not limited to, pentaethylenehexamine or ethylenediamine, so as to provide the nitrogen and carbon source, (b) adding MCM-41 into the solution, (c) adding at least one transition metal precursor into the solution to form a slurry, (d) subjecting the slurry to agitation and evaporation to form a solid mixture, (e) subjecting the solid mixture to heat treatment at 750° C. for 2 hours in an inert environment, and (f) washing the solid with sodium hydroxide solution, sulphuric acid solution and DI water and finally drying.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A composite catalyst comprising:
a first catalytic material incorporated with a second catalytic material, wherein the first catalytic material comprises carbon doped with (i) nitrogen and (ii) at least one non-precious transition metal, and wherein the second catalytic material comprises a carbon-based supporting material incorporated with platinum nanoparticles.

2. The composite catalyst of claim 1, wherein the first catalytic material is porous.

3. The composite catalyst of claim 1, wherein the at least one non-precious transition metal is present in the first catalytic material in an amount ranging from 0.1 wt % to 20 wt % of the first catalytic material.

4. The composite catalyst of claim 1, wherein the at least one non-precious transition metal comprises cobalt, copper, iron, molybdenum, and/or nickel.

5. The composite catalyst of claim 1, wherein in the second catalytic material, the platinum nanoparticles are formed on the carbon-based supporting material, wherein the carbon-based supporting material comprises carbon particles, carbon nanotubes, graphenes, or a mixture thereof.

6. The composite catalyst of claim 1, wherein:
the platinum nanoparticles comprise an average diameter ranging from 1.6 nm to 10 nm; and/or
the platinum nanoparticles are present in an amount ranging from 5% to 80% by mass of the second catalytic material.

7. The composite catalyst of claim 1, wherein the first catalytic material and the second catalytic material are present in a mass ratio of 5:95 to 95:5.

8. The composite catalyst of claim 1, further comprising an ionomer, wherein the ionomer comprises perfluorinated sulfonic acid, sulfonated tetrafluoroethylene, or a mixture thereof.

9. A method of producing a composite catalyst comprising a first catalytic material incorporated with a second catalytic material, wherein the first catalytic material comprises carbon doped with (i) nitrogen and (ii) at least one non-precious transition metal, and wherein the second catalytic material comprises a carbon-based supporting material incorporated with platinum nanoparticles, the method comprising:
providing a mixture comprising the first catalytic material and the second catalytic material; and
subjecting the mixture to a size reduction step.

10. The method of claim 9, wherein providing the mixture comprises:
dispersing the first catalytic material in an alcohol to form a first dispersion;

dispersing the second catalytic material in an alcohol to form a second dispersion; and mixing the first dispersion and the second dispersion to form the mixture.

11. The method of claim 10, wherein dispersing the first catalytic material in the alcohol comprises dispersing an ionomer in the alcohol to form the first dispersion, and/or dispersing the second catalytic material in the alcohol comprises dispersing an ionomer in the alcohol to form the second dispersion, wherein the ionomer comprises perfluorinated sulfonic acid, sulfonated tetrafluoroethylene, or a mixture thereof.

12. The method of claim 9, wherein providing the mixture comprises forming the first catalytic material, wherein forming the first catalytic material comprises:

dispersing a structure-directing agent in an aqueous medium, wherein the aqueous medium comprises (i) at least one metal salt and/or at least one metal oxide and (ii) at least an organic compound comprising an amine;

mixing the aqueous medium and at least one non-precious transition metal precursor to form a liquid ink;

drying the liquid ink to form a viscous solid; and pyrolyzing the viscous solid in an inert atmosphere to form the first catalytic material.

13. The method of claim 12, wherein the at least one metal salt and/or the at least one metal oxide comprise a metal selected from the group consisting of an alkali metal and a transition metal, wherein the organic compound comprising the amine comprises ethylenediamine, pentaethylenehexamine, or a polyamine, and wherein the structure-directing agent comprises a xerogel, wherein the xerogel comprises a silica xerogel, MCM-41, MCM-48, ZnO, an analogue thereof, or a mixture thereof.

14. The method of claim 12, wherein mixing the aqueous medium and the at least one non-precious transition metal precursor comprises mixing the aqueous medium and an alcoholic solution comprising the at least one non-precious transition metal precursor, wherein the alcoholic solution comprises ethanol, iso-propanol, n-propanol, ethylene glycol, or a mixture thereof, wherein the at least one non-precious transition metal precursor comprises a cobalt salt, a copper salt, an iron salt, a molybdenum salt, and/or a nickel salt.

15. The method of claim 9, wherein providing the mixture comprises forming the first catalytic material, and wherein forming the first catalytic material comprises:

mixing a solid mixture comprising (i) at least one non-precious transition metal precursor and (ii) an organic compound comprising an imidazole; and pyrolyzing the solid mixture in an alkaline atmosphere to form the first catalytic material.

16. The method of claim 15, wherein the at least one non-precious transition metal precursor comprises a cobalt salt, a copper salt, an iron salt, a molybdenum salt, and/or a nickel salt, and wherein the organic compound comprising an imidazole comprises 2-methylimidazole, benzimidazole, or a mixture thereof.

17. The method of claim 9, wherein providing the mixture comprises forming the second catalytic material, wherein forming the second catalytic material comprises:

mixing a carrier ink and a precursor solution;

adding a base to render a pH greater than 10; and heating the carrier ink and the precursor solution to form the second catalytic material.

18. The method of claim 17, wherein mixing the carrier ink and the precursor solution comprises:

dispersing the carbon-based supporting material in an alcohol to form the carrier ink; and mixing a platinum precursor and a (i) citrate or (ii) citric acid in an alcohol to form the precursor solution.

19. The method of claim 18, wherein the alcohol to form the carrier ink and the precursor solution comprises ethanol, iso-propanol, n-propanol, ethylene glycol, or a mixture thereof and wherein the platinum precursor comprises chloroplatinic acid, potassium chloroplatinate, platinum nitrate, or a mixture thereof.

20. The method of claim 17, further comprising separating the second catalytic material to obtain a solid form of the second catalytic material after precipitating the second catalytic material by subjecting the second catalytic material to a pH in the acidic range, wherein the precipitating is carried out after heating of the carrier ink and the precursor solution.

* * * * *